(12) United States Patent
Johnson

(10) Patent No.: US 11,003,133 B2
(45) Date of Patent: May 11, 2021

(54) SPECIAL HOLOGRAPHIC SECURITY SYSTEMS AND SIMILAR HOLOGRAPHIC DEFENSE SYSTEMS

(71) Applicant: Anthony Dewayne Johnson, Anderson, IN (US)

(72) Inventor: Anthony Dewayne Johnson, Anderson, IN (US)

(*) Notice: Subject to any disclaimer, the term of this patent is extended or adjusted under 35 U.S.C. 154(b) by 88 days.

(21) Appl. No.: 15/974,175

(22) Filed: May 8, 2018

(65) Prior Publication Data

US 2019/0033781 A1     Jan. 31, 2019

Related U.S. Application Data

(60) Provisional application No. 62/503,870, filed on May 9, 2017.

(51) Int. Cl.
*G08B 13/00*     (2006.01)
*G03H 1/00*      (2006.01)
(Continued)

(52) U.S. Cl.
CPC ......... *G03H 1/0011* (2013.01); *G08B 15/002* (2013.01); *G03H 2210/30* (2013.01); *G03H 2210/56* (2013.01); *H04N 7/181* (2013.01)

(58) Field of Classification Search
CPC ............. G03H 1/0011; G03H 2210/56; G03H 2210/30; G08B 15/002; H04N 7/181; H04N 5/23293; H04N 21/8358; H04N 2005/91342; H04N 21/4181; H04N 21/4405; H04N 21/42646; H04N 21/4135; H04N 21/4223; H04N 21/44236; H04N 21/4325; H04N 21/4627; H04N 5/913; H04N 21/25816; H04N 7/1675; H04N 2005/91364; H04N 21/21805; H04N 21/2187; H04N 21/233; H04N 21/23418; H04N 21/251; H04N 21/25866; H04N 21/2665; H04N 21/2668; H04N 21/2743; H04N 21/42203; H04N 21/44218; H04N 21/4622; H04N 21/4788; H04N 21/6581;
(Continued)

(56) References Cited

U.S. PATENT DOCUMENTS 5,819,124 A * 10/1998 Somner ............ G08B 13/19632
                                                            396/263
6,127,066 A    10/2000 Ueda et al.
(Continued)

*Primary Examiner* — Daniel Previl
(74) *Attorney, Agent, or Firm* — Ritchison Law Offices, PC; John D Ritchison

(57) ABSTRACT

A special holographic security system utilizing and centered on holographic images of homeowners or security guards to provide safety for a person's home, businesses and properties by incorporating the hologram image with the sensors, lights, cameras and other security hardware. The hologram image can be incorporated with sound, pre-recorded messages, and real time surveillance, and smart phone applications to interact with potential break-ins and security breaches. Also taught are significant ways and methods that use of holographic systems can improve homeland security as well as defense tactics to increase security and save lives. This holographic security concept can be implemented in various creative ways to preserve security in the United States and abroad.

10 Claims, 19 Drawing Sheets

(51) Int. Cl.
*G08B 15/00* (2006.01)
*H04N 7/18* (2006.01)

(58) Field of Classification Search
CPC ........... H04N 21/6582; H04N 21/8193; H04N 2005/91335; H04N 21/26613; H04N 21/8355; H04N 21/4826; A01B 69/008; A01D 34/008; A01D 34/84; A01D 43/14; A01G 3/085; B60K 2350/1012; B60K 2350/1028; B60K 2350/2026; B60K 2350/357; B60K 2370/141; B60K 2370/1438; B60K 2370/164; B60K 2370/29; B60K 2370/589; B60K 35/00; B60Q 9/00; B64C 2201/027; B64C 2201/108; B64C 2201/12; B64C 2201/141; B64C 2201/146; B64C 39/024; E04D 13/0765; G01C 11/025; G01C 21/367; G01C 21/3676; G01C 21/3697; G05D 1/0094; G05D 2201/0208; G06F 16/93; G06F 19/00; G06F 3/0481; G06F 3/0488; G06F 21/50; G06F 21/62; G06F 21/6281; G06F 21/78; G06F 21/10; G06F 21/64; G06F 3/011; G06F 3/013; G06F 3/017; G06F 3/04815; G06F 3/0482; G06F 3/04842; G06F 9/445; G06F 16/5838; G06Q 30/0277; G06Q 30/0201; G06Q 50/188; G07C 5/008; G16H 10/60; H04L 12/40189; H04L 2012/40215; H04L 2012/40273; H04L 2209/56; H04L 2209/60; H04L 9/3236; H04L 9/3249; H04L 2209/606; H04L 51/10; H04L 51/32; H04L 9/0844; H04L 9/302; H04L 9/3271; H04L 2209/603; H04L 2209/608; H04L 9/0891; H04L 9/3247; H04W 4/021; G11B 20/00086; G11B 20/0021; G11B 20/00246; G11B 20/00818; G11B 20/00884; G11B 20/00115; G11B 20/00231; G11B 20/00253; G11B 20/00449; G11B 20/00659; G11B 20/00166; G11B 20/00173; G11B 20/0084; G10L 19/018; G02B 2027/014; G02B 2027/0178; G02B 2027/0187; G02B 27/017; G06K 9/00228; G06K 9/00362; G06K 9/4604; G06K 9/6223; G06K 9/6282; G06K 9/46; G06T 1/0021; G06T 2201/005; G06T 2200/24; G06T 2207/20132; G06T 7/11; G06T 7/12; G06T 7/13; G06T 7/181; H04H 2201/30; H04H 2201/37; H04H 60/33; H04H 60/37; H04H 60/45; H04H 60/46; H04H 60/66; B41M 5/00; B41M 5/26; B41M 5/267; B41M 5/36; B44C 3/046; B44C 3/048; B44C 5/00; B44D 3/18; B44F 1/00; C08K 3/04; C08K 5/005
USPC ... 340/541, 5.82, 539.32, 545.3, 568.1, 565, 340/568.5, 568.8, 572.7, 572.8, 571, 340/636.17, 692, 5.25
See application file for complete search history.

(56) References Cited

U.S. PATENT DOCUMENTS

| | | | |
|---|---|---|---|
| 8,264,757 B2 | 9/2012 | Ha | |
| 8,656,434 B2* | 2/2014 | Sato | H04N 5/44 725/51 |
| 8,717,650 B2 | 5/2014 | Ha | |
| 2004/0103222 A1* | 5/2004 | Carr | G06F 3/002 710/1 |
| 2004/0215557 A1* | 10/2004 | Michelsen | G06Q 20/10 705/39 |
| 2006/0239512 A1* | 10/2006 | Petrillo | G06F 21/31 382/115 |
| 2008/0101604 A1* | 5/2008 | Kocher | G06F 21/50 380/210 |
| 2010/0198453 A1* | 8/2010 | Dorogusker | A63B 24/0084 701/31.4 |
| 2014/0081659 A1* | 3/2014 | Nawana | G16Z 99/00 705/3 |
| 2015/0220058 A1 | 8/2015 | Mukhtarov et al. | |
| 2016/0267759 A1* | 9/2016 | Kerzner | G08B 13/19697 |
| 2017/0023911 A1* | 1/2017 | Russell | G03H 1/0005 |

\* cited by examiner

Recording a hologram

Reconstructing a hologram

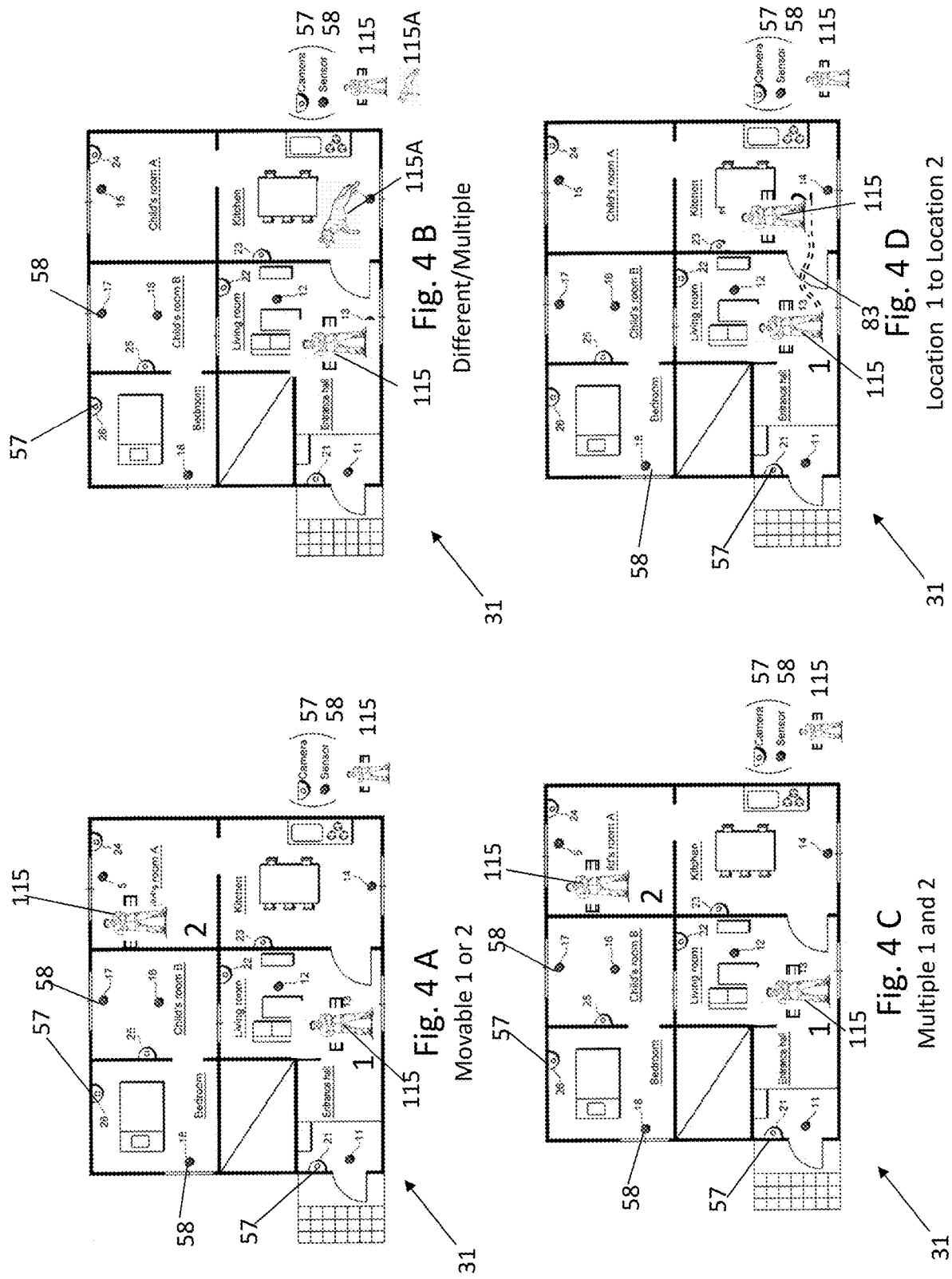

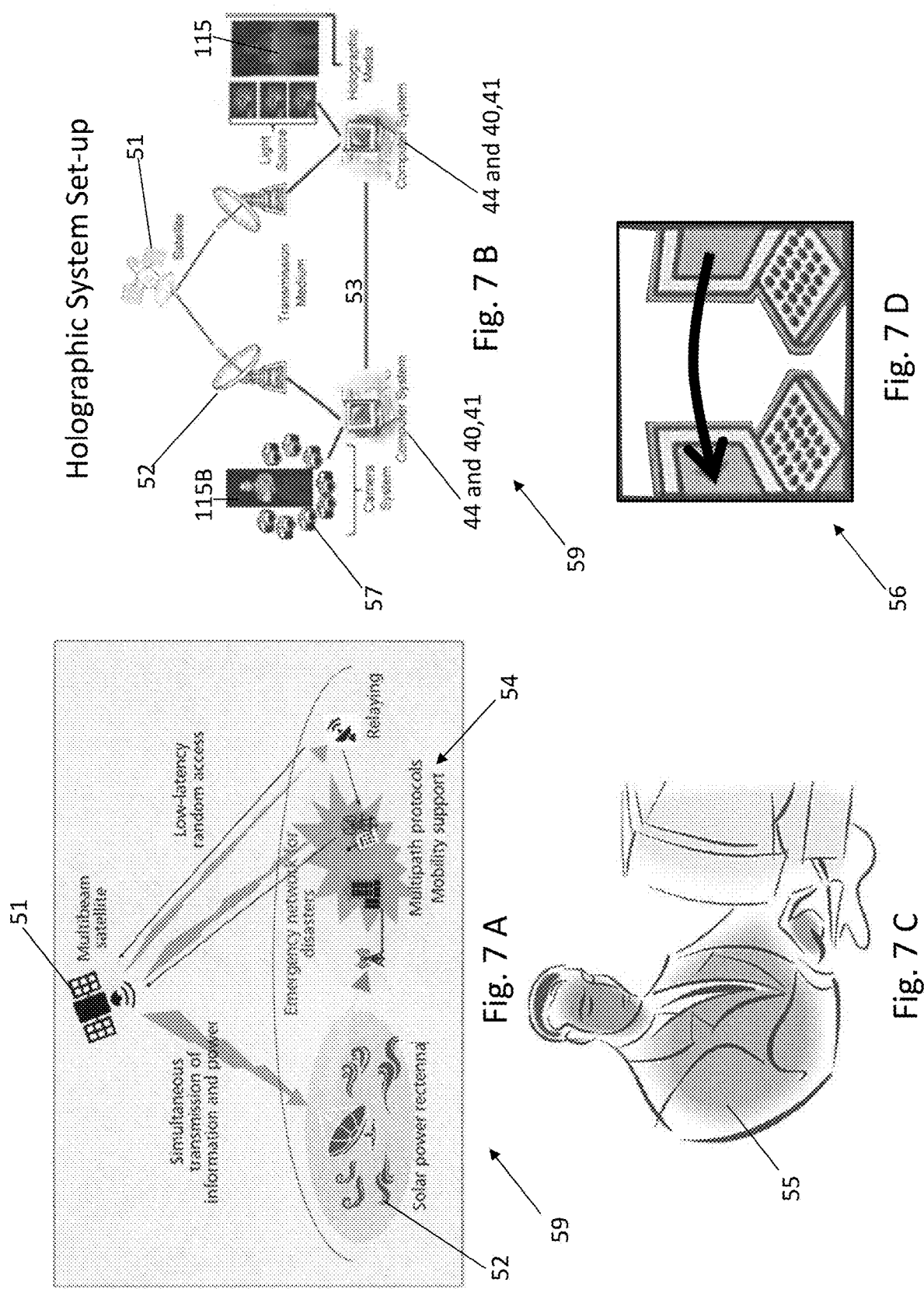

HOLOGRAM IMAGES MULTI-USE
IN THE VERY NEAR FUTURE HOLOGRAMS
CAN BE USED IN A VARIETY OF WAYS FROM:
1. SECURITY
2. SPORTING EVENTS
3. COURT PROCEEDINGS
4. CHURCH SERMONS IN RESTRICTED AREAS
5. SPECIAL SURGERIES
6. UNITED NATIONS MEETINGS
7. PUBLIC SAFETY
8. INTELLIGENCE OPERATIONS
9. MILITARY OPERATIONS
10. FUNERAL INDUSTRY
11. DEPARTMENT OF HOMELAND SECURITY
12. UNIVERSITIES, COLLEGES, SCHOOLS
13. FEDERAL BUREAU OF PRISONS
14. PRIVATE INVESTIGATIONS
15. PRIVATE SECURITY
16. ASTRONAUT/ SPACE EXPLORER

Fig. 8 B

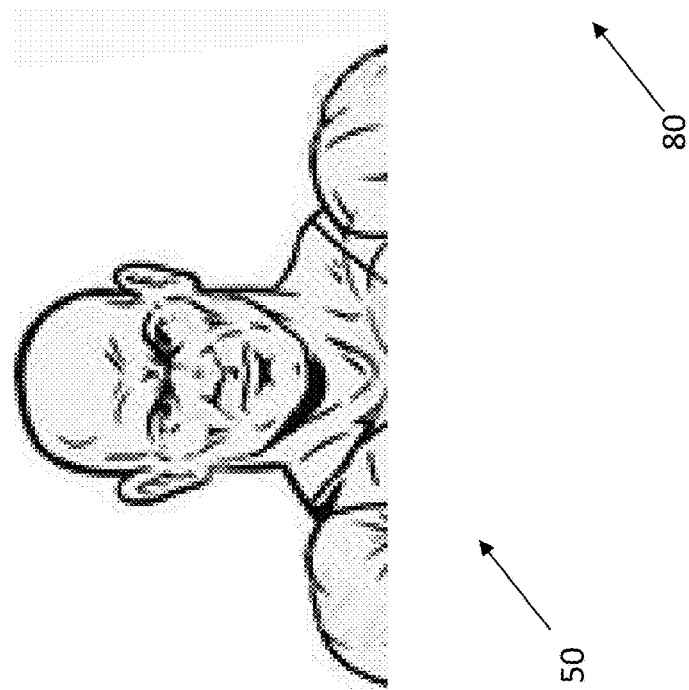

Fig. 8 A

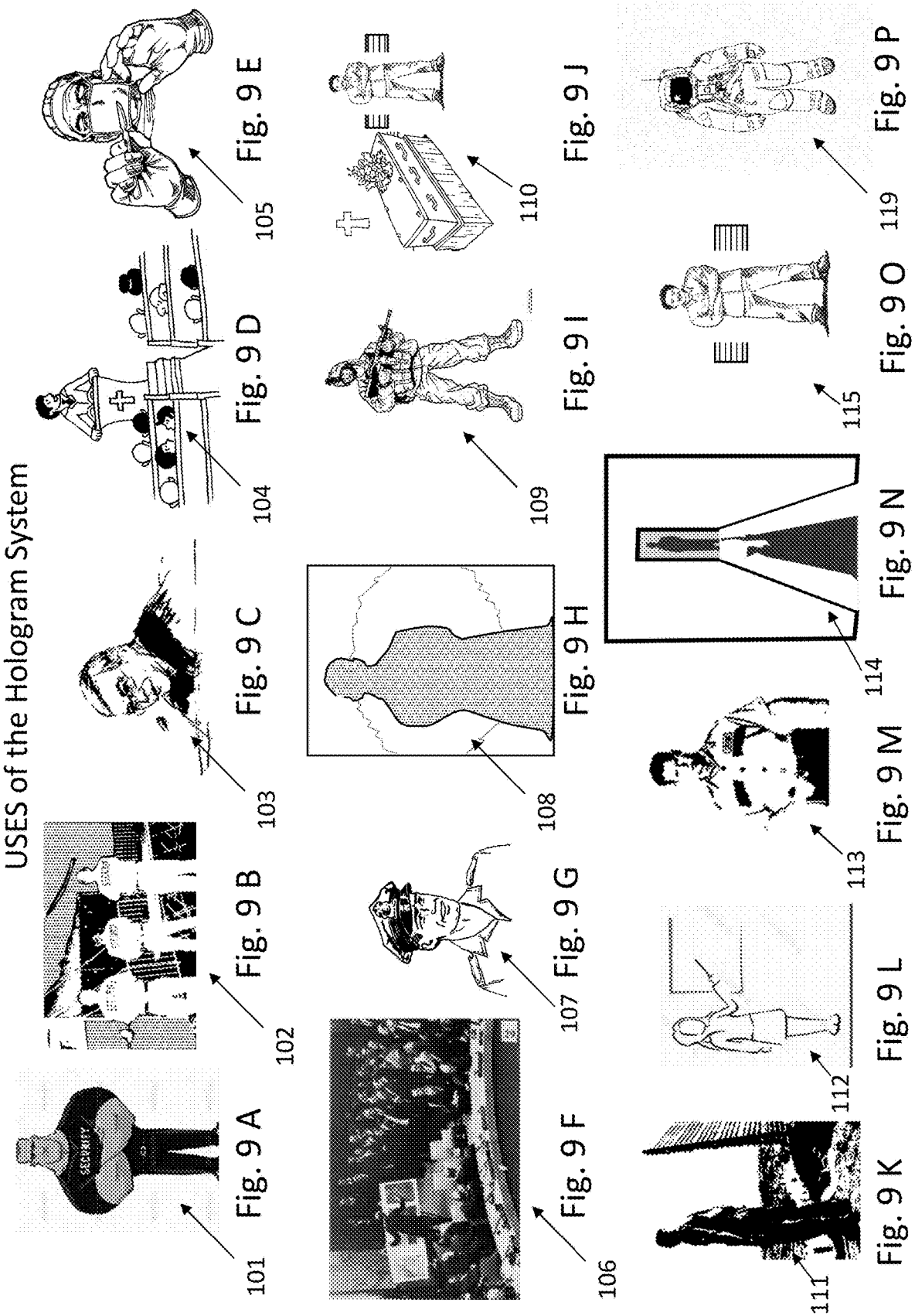

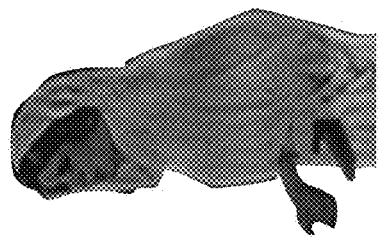
Fig. 13 A
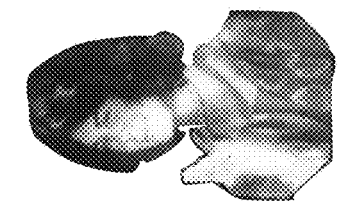
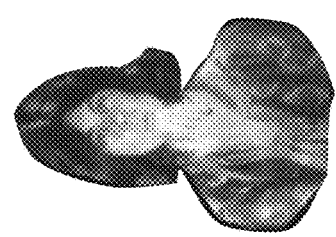
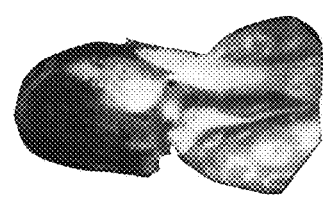
Fig. 13 B
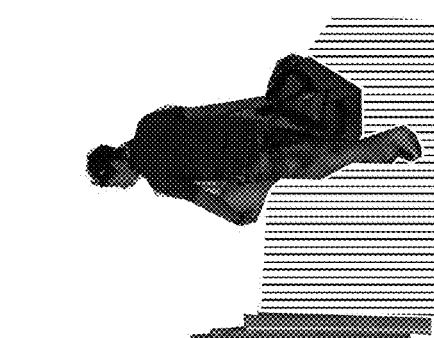
Fig. 13 C
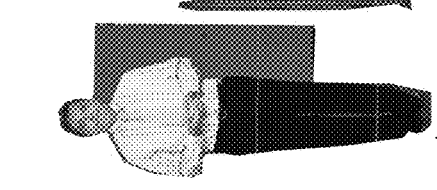
Fig. 13 D
Fig. 13 F
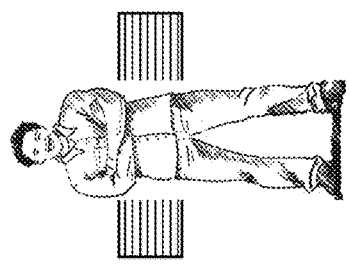
Fig. 13 E
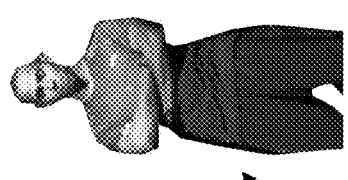
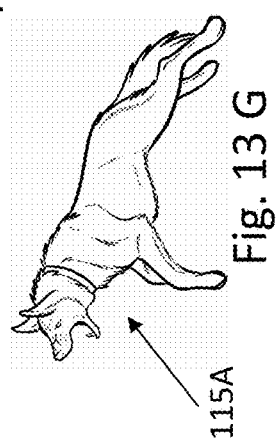
Fig. 13 G

US 8,264,757
US 8,717,650

US 6,856,434

US 8,264,757
US 8,717,650

US 6,127,066

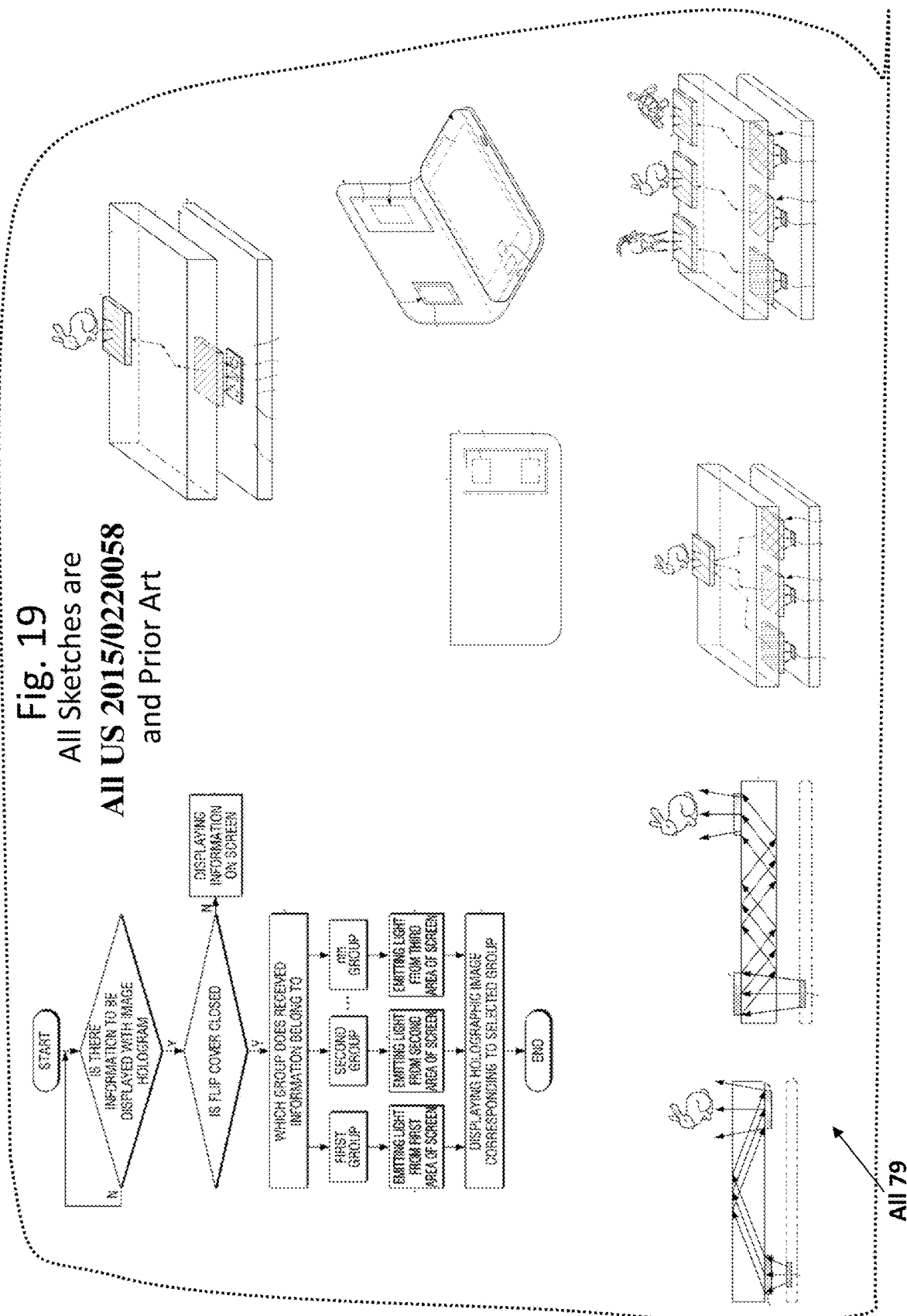

SPECIAL HOLOGRAPHIC SECURITY SYSTEMS AND SIMILAR HOLOGRAPHIC DEFENSE SYSTEMS

CROSS-REFERENCE TO RELATED APPLICATIONS

This application claims the benefit of U.S. Provisional Patent Application with Ser. No. 62/503,870 May 9, 2017, by Anthony Dewayne Johnson and entitled "Special holographic security systems and similar holographic defense systems".

FIELD OF INVENTION

This invention relates to a Special holographic security systems and similar holographic defense systems. It also relates to a method and system for Homeland Security and Defense Departments to use holograms and artificial intelligence to improve their effectiveness and efficiencies and to potentially save lives. The particular home and business system relates to a security solution that augments security systems with a hologram image and audio with real life sound effects that would strategically scare and frighten away any would be burglar. The defense system relates to systems that uses holograms and artificial intelligence to increase the apparent visual and audio of more soldiers and security personnel to improve effectiveness without putting as many soldiers in harm's way. The system uses holography, and in particular a hologram, for improving home and business security systems as well as helping to improve defense systems and devices.

FEDERALLY SPONSORED RESEARCH

None.

SEQUENCE LISTING OR PROGRAM

None.

BACKGROUND—FIELD OF INVENTION AND PRIOR ART

As far as known, there are no Special holographic security systems and similar holographic defense systems or the like. It is believed that this system is unique in its design and technologies.

Background and Problem Solved

There is a need for Hologram images for homeowners providing safety for their homes businesses and properties with the potential to go beyond. This holographic security concept needs to and can be implemented in various creative ways to preserve security in the United States and abroad. The first effort is to target the home and business owners that have alarm systems. With the hologram security system and other artificial intelligence, they can upgrade their alarm system to a realistic security device that will literally scare/ frighten the assailant and contemporaneously alert the police (i.e. at the same time), thus revolutionizing the security alarm industry. This would enable the homeowners to create an image of themselves or a desired character of their choice (such as a bodyguard or uniformed security) to protect their home. A second step is to target the Department of Defense (DOD) with the same concept, only one would upgrade it to where the idea can be applied to national security needs and functions. This would entail a hologram image that can be deployed to a certain grid location in a country in order to obtain vital information in real time and to protect the national security of the United States and her closest valuable allies. Various home and business security system improvements can be: simple installation of existing components with simple to install instructions and use/add-on the hologram and artificial intelligence upgrades and hologram projectors to most existing security systems. Homeland Security and Department of Defense benefits by multiplying the visual presence of Homeland Security and Defense personnel (such as soldiers, border personnel, TSA workers); by potentially saving lives of defensive soldiers deployed on peacekeeping missions; and by potentially delivering explosive ordinance without troops being present in the immediate patrol zone.

Prior Art

A novelty search revealed:
A. U.S. Pat. No. 8,264,757 by Ha in 2012 for Method and System for Producing Multiple Images in a Single Image Plane Using Diffraction Methods create images viewable under different selected angles on optical storage devices and other photosensitive surfaces and optical storage devices with super-imposed images. Generally, a photosensitive surface is exposed with multiple diffraction patterns creating super-imposed images. These diffraction patterns create super-imposed images on the photosensitive surfaces, which can be read by either a human or a computer.
B. U.S. Pat. No. 8,717,650 by Ha in 2014 for Method and System for Producing Multiple Images in a Single Image Plane Using Diffraction Methods create images viewable under different selected angles on optical storage devices and other photosensitive surfaces and optical storage devices with super-imposed images. Generally, a photosensitive surface is exposed with multiple diffraction patterns creating super-imposed images. These diffraction patterns create super-imposed images on the photosensitive surfaces, which can be read by either a human or a computer.
C. U.S. Pat. No. 6,127,066 by Ueda et al. in 2000 for Hologram Recording Sheet, Holographic Optical Element Using Said Sheet, and it's Production Process The hologram recording sheet according to the invention is made up of a base film and hologram sensitive materials sensitive to different wavelength regions formed therein in a desired pattern, or a film and at least two hologram recording sensitive materials sensitive to different wavelength regions laminated on the film with a transparent plastic spacer layer located there between, thereby enabling the required diffraction light wavelengths to be recorded on the required sites without producing unnecessary interference fringes. At least two hologram recording sensitive materials sensitive to different wavelength regions are formed on different sites on a film in dotted or striped configuration, the size of which is up to 200 mm or at least twice as large as the thickness of the sensitive material layers, thereby enabling regions diffracting light of different wavelengths to be formed in the form of independent sets of interference fringes.
D. U.S. Pat. No. 6,856,434 by Ashizaki in 2005 for Image Reproducing Apparatus and Image Illuminating Apparatus Angle of incidence of reproducing light with respect to a hologram or a holographic stereogram is adjusted so that a reproduced image can be repetitively viewed without requiring the viewer to move his or her viewpoint. The components of the image reproducing apparatus can be roughly classified into a power supply unit equipped with a power supply for generating a driving power and various types of electric circuits, a light source unit equipped with light emitting diodes and the like, a supporting unit for supporting the light source unit, and a holographic stereogram display unit for holding the holographic stereogram and displaying an image. In this image reproducing apparatus, the light source unit is swingably or turnably moved repetitively with respect to the holographic stereogram so that the reproducing light has angle of incidence changed on the holographic stereogram, thus allowing change of viewed image.

E. 2015/0220058 by Ha/Sung Sub in 2015 for Device for Protecting Crops Using Hologram of Natural Enemy Eyes and Method for Fabricating the same mobile device is provided which is capable of displaying a hologram. The mobile device includes a main body including a screen; a light guide member disposed above the screen; an entrance optical member disposed on a surface of the light guide member; and an image hologram disposed on a surface of the light guide member and laterally spaced apart from the entrance optical member. When an area of the screen corresponding to the entrance optical member emits a light, a holographic image stored in the image hologram is displayed above the light guide member.

As far as known, there are no Special holographic security systems and similar holographic defense systems or the like. It is believed that this system is unique in its design and technologies. None of this art anticipated the Johnson innovation nor renders the new, holographic security system as obvious to one skilled in the art of security and holographic systems.

SUMMARY OF THE INVENTION

This invention is a Special holographic security systems and similar holographic defense systems. Taught here are the ways a home or business security system can be greatly improved with the use of holograms and other artificial intelligence. This is a special holographic security system utilizing and centered on holographic images of homeowners or security guards to provide safety for a person's home, businesses and properties by incorporating the hologram image with the sensors, lights, cameras and other security hardware. The hologram image can be incorporated with sound, pre-recorded messages, real time surveillance, and smart phone applications to interact with potential break-ins and security breaches. Also taught are significant ways and methods that use of holographic systems can improve homeland security as well as defense tactics to increase security and save lives.

The preferred embodiment of a Special holographic security systems and similar holographic defense system is comprised of: a.) at least one Computer System; b.) a Satellite Link; c.) a Wireless Access Point; d.) a set of motion Sensors; e.) at least one powered hologram stationary or movable support disk; f.) a Hologram projector; g.) a Pre-programed holographic image and optional audio message; and h.) a group of monitoring devices including a Smart phone, a smart watch, an emergency surveillance team, and other communication outlets with monitoring screens and audio systems wherein a sensor breach communicates with a satellite link which in turn concurrently activates the hologram security image and system, produces a hologram image in real time, alerts the local police, and contacts the home and/or business owner to detect and deter criminal activity. An alternative to the preferred system is one where the satellite link is comprised of at least one satellite, at least one receiving dish; and wired or wireless linkage to the monitoring computer system. Another embodiment is a method for using a Special holographic security systems comprised of:

Step 1: Purchasing a hologram security system by home owners, business owners, DOD, DHS, Private Sector, or Global Businesses for securing their property.

Step 2: Assemblying the easy to use Hologram Security System with Satellite Link;

Step 3: Connecting all desired communication devices to the Hologram Security System;

Step 4: Uploading desired hologram security image with verbal alert into the Hologram Security System;

Step 5: Strategically placing the hologram security system in desired area and place sensors near areas of concern for both inner and outer perimeters;

Step 6: Activating Hologram Security System; and

Step 7: Monitoring the Hologram Security System.

An embodiment for homeland security is a Special holographic homeland defense security systems comprised of: a.) an at least one Border patrol agent monitors the cameras with a hologram program which projects images of agents locating illegal entry points to US borders; and b). a hologram security system that alerts a border patrol command center when a sensor is activated which gives the exact location of an intruder making it virtually impossible to enter the US illegally. An embodiment for defense enhancements is a Special holographic defense security systems comprised of: a.) a holographic control system; b.) a stationary or movable support disk; c.) a hologram projector; d.) a pre-programed hologram image of a soldier or animal or vehicle with optional audio; e.) an optional ordinance with the platform; and f.) an optional soldier(s) for the patrol.

The newly invented Special holographic security systems and similar holographic and artificial intelligence defense systems can be manufactured at low volumes by very simple means and in high volume production by more complex and controlled systems.

Objects and Advantages

There are several objects and advantages of the Special holographic security systems and similar holographic defense systems. There are currently no known holographic security systems that are effective at providing the objects of this invention.

The Special holographic security systems and similar holographic defense systems has various advantages and benefits:

| Item | Advantages |
|---|---|
| 1 | Is simple to install with instructions |
| 2 | Uses many component parts that are already produced |
| 3 | Provides a universal design for stationary and moveable platforms |
| 4 | Can use current and future hologram projectors |

-continued

| Item | Advantages |
|---|---|
| 5 | Can multiply the visual presence of Homeland Security and Defense personnel (such as soldiers) |
| 6 | Augments current home and business security systems with holographic and artificial intelligence capability |
| 7 | Represents new products and processes to increase potential revenues of a security company |
| 8 | Potentially can save lives of defensive soldiers deployed on peacekeeping missions |
| 9 | Potentially can deliver explosive ordinance without troops present in the immediate patrol zone |

Finally, other advantages and additional features of the present Special holographic security systems and similar holographic defense systems will be more apparent from the accompanying drawings and from the full description of the device. For one skilled in the art of security systems and the art of holographic displays, it is readily understood that the features shown in the examples with this product are readily adapted to other types of security and defense systems and devices.

DESCRIPTION OF THE DRAWINGS—FIGURES

The accompanying drawings, which are incorporated in and constitute a part of this specification, illustrate an embodiment of the Special holographic security systems and similar holographic defense systems that are preferred. The drawings together with the summary description given above and a detailed description given below serve to explain the principles of the Special holographic security and defense systems. It is understood, however, that the Special holographic security and defense systems is not limited to only the precise arrangements and instrumentalities shown.

FIGS. 4A through 4D are more sketches of the Special holographic security systems for homes and businesses with several options shown.

FIG. 7A through 7D are sketches of holographic interconnect systems as well as computer security for the Special holographic security systems and similar holographic defense systems with components and features shown.

FIGS. 8A and 8B are sketches of the deterring hologram figure and a list of uses for the Special holographic security and defense systems.

FIG. 9A through 9P are sketches of the uses for the Special holographic systems for defense and homeland security.

FIG. 13A through 13G are sketches of examples of holograms used for the Special holographic security systems and similar holographic defense systems.

FIG. 18A through 18D and FIG. 19 are sketches of prior art.

DESCRIPTION OF THE DRAWINGS—REFERENCE NUMERALS

Figure 1:
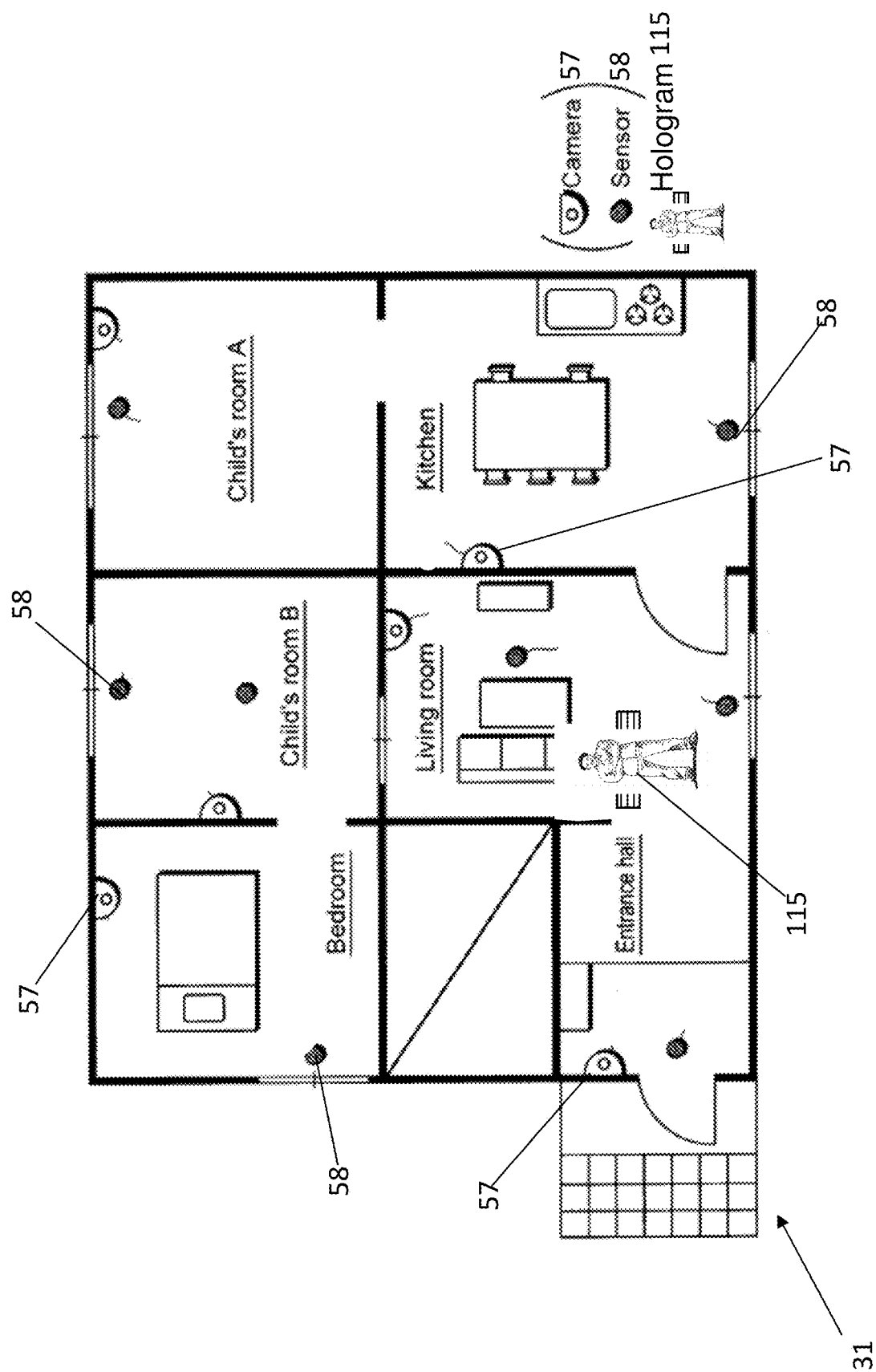
FIG. 1 is a sketch of the basic Special holographic security systems for homes and businesses.

The following list refers to the drawings:

TABLE B

Reference numbers:

| Ref # | Description |
|---|---|
| 30 | Special holographic security systems and similar holographic defense systems 30 |
| 31 | Special holographic security systems 31 for homes and businesses |
| 32 | Special holographic systems 32 for defense and homeland security |
| 33 | basic hologram set-up sketch 33 of how a Hologram works |
| 34 | home area 34 |
| 35 | business area or areas 35 |
| 37 | Department of Defense and all defense agencies 37 |
| 38 | Homeland Security 38 |
| 39 | Pentagon - DOD - 39 |
| 40 | monitoring station 40 for home and business system 31 |
| 41 | monitoring station 41 for defense system 32 |
| 42 | Wi-Fi and system interconnects 42 for home and business system 31 |
| 44 | monitoring computer 44 |
| 45 | criminal element 45 |
| 46 | security monitor attendant 46 |
| 47 | cell phone/smart phone monitoring station 40 for home and business system 47 |
| 48 | tablet 48 |
| 49 | printer 49 |
| 50 | deterring hologram FIG. 50 |
| 51 | satellite 51 for transmitting signals and data |
| 52 | transceivers 52 of signals and data |
| 53 | transmission modes 53 - wire and wireless |
| 54 | mobility support and protocol systems 54 |
| 55 | hacker 55 |
| 56 | mirror computer and system 56 to deter hacker 55 |
| 57 | home and business security cameras 57 |
| 58 | home and business security sensors 58 |
| 59 | satellite transmission communication 59 |
| 60 | laser light 60 to create hologram image |
| 61 | hologram object 61 |
| 62 | hologram virtual 3-D image 62 |
| 63 | mirror 63 |

TABLE B-continued

Reference numbers:

| Ref # | Description |
|---|---|
| 64 | reference beam 64 |
| 65 | object beam 65 |
| 66 | photographic plate 66 |
| 67 | beam splitter 67 |
| 70 | business person hologram image 70 |
| 71 | sign language communicator hologram image 71 |
| 72 | motion picture hologram image 72 from different genres |
| 73 | prototype security design sketch 73 by Johnson |
| 74 | early holography design sketch 74 |
| 75 | prior Art 75 Pat. no. 8,264,757 |
| 76 | prior Art 76 Pat. no. 8,717,650 |
| 77 | prior Art 77 Pat. no. 6,127,066 |
| 78 | prior Art 78 Pat. no. 6,856,434 |
| 79 | prior Art 79 Patent Application US 2015/0220058 |
| 80 | list of uses 80 for the Special holographic security and defense systems 30 |
| 82 | track/train track lead system 82 |
| 83 | Pre-Programmed (Roomba), drive by wire/programmed tracking or moving system 83 |
| 84 | circular projector 84 |
| 85 | stationary disk 85 |
| 86 | oblong stationary platform 86 |
| 87 | military vehicle 87 such as a truck, jeep, tank, half-track etc. |
| 88 | a moving tread Radio Controlled carry device 88 |
| 89 | Radio Controlled air float, floating base/carrying device 89 |
| 90 | Hologram Patrol -Ordinance 90 |
| 91 | Hologram soldier 91 |
| 92 | mixed soldier and hologram patrol - no ordinance 92 |
| 93 | Soldier 93 |
| 94 | a Radio Controlled moving four wheel carrying device 94 |
| 96 | ordinance 96 - explosive devices with various detonation - contact, timed, remote control etc. |
| 97 | typical up-direction prism hologram projector 97 |
| 98 | smart phone up-direction hologram projector 98 |
| 99 | convention action video hologram projector 99 |
| 101 | use as security 101 |
| 102 | use at sporting events 102 |
| 103 | use in court proceedings 103 |
| 104 | use for church sermons in restricted areas 104 |
| 105 | use for special surgeries 105 |
| 106 | use for United Nations meetings 106 |
| 107 | use in public safety 107 |
| 108 | use in intelligence operations 108 |
| 109 | use in military operations 109 |
| 110 | use in the funeral home industry 110 |
| 111 | use by the Department of Homeland Security 111 |
| 112 | use by universities, colleges and schools 112 |
| 113 | use by the Federal Bureau of Prisons 113 |
| 114 | use by private investigations 114 |
| 115 | use by private security 115 |
| 115A | guard dog or other non-human guard device hologram image 115A |
| 115B | security person or model as object 115B for hologram 115 |
| 116 | border guards 116 |
| 117 | border fence or obstacle 117 |
| 118 | border detainee 118 |
| 119 | NASA or space assist hologram 119 |

DETAILED DESCRIPTION OF PREFERRED EMBODIMENT

The present development is a Special holographic security systems and similar holographic defense systems. It relates to a method and system for home and business security as well as Homeland Security and Defense Departments use of holograms and artificial intelligence to improve their effectiveness and efficiencies and potentially save lives. The particular home and business system relates to a security solution that augments security systems with a hologram image and audio with real life sound effects that would surely scare and frighten away any would be burglar. The defense system relates to systems that uses holograms to increase the apparent visual and audio of more soldiers and security personnel to improve effectiveness without putting as many soldiers in harm's way. The system uses holography, and in particular a hologram for improving home and business security systems as well as helping to improve defense systems and devices.

The advantages for the Special holographic security systems and similar holographic defense systems 30 are listed above in the introduction. Succinctly the benefits are that the device:

A. Is simple to install with instructions;
    B. Uses many parts that are already produced;
    C. Provides a universal design for stationary and moveable platforms;
    D. Can use current and future hologram projectors;
    E. Can multiply the visual presence of Homeland Security and Defense personnel (such as soldiers);
    F. Augments current home and business security systems with holographic and artificial intelligence capability;
    G. Represents new products and processes to increase potential revenues of a security company;
    H. Potentially save lives of defensive soldiers deployed on peacekeeping missions;
    I. Potentially delivers explosive ordinance without troops present in the immediate patrol zone.

The preferred embodiment of a Special holographic security systems and similar holographic defense system is comprised of: a.) an at least one Computer System; b.) a Satellite Link; c.) a Wireless Access Point; d.) a set of motion Sensors; e.) at least one powered hologram stationary or movable support disk; f.) a Hologram projector; g.) a Pre-programed holographic image and optional audio message; and h.) a monitoring devices such as Smart phone, a smart watch, a computer tablet, a desk top personal computer, an emergency surveillance system of a security team/company, and other communication outlets with monitoring screens and audio systems wherein a sensor breach communicates with a satellite link which in turn activates the hologram security system and alerts the local police and the home or business owner at the same time and produces a hologram image in real time to detect and deter criminal activity. An alternative to the preferred system is one where the satellite link is comprised of at least one satellite, at least one receiving dish; and wired or wireless linkage to the monitoring computer system. Another embodiment is a method for using a Special holographic security systems comprised of:

Step 1: Purchasing a hologram security system by home owners, business owners, DOD, DHS, Private Sector, or Global Businesses for securing their property.
    Step 2: Assemblying the easy to use Hologram Security System with Satellite Link;
    Step 3: Connecting all desired communication devices to the Hologram Security System;
    Step 4: Uploading desired hologram security image with verbal alert into the Hologram Security System;
    Step 5: Strategically placing the hologram security system in desired area and place sensors near areas of concern for both inner and outer perimeters;
    Step 6: Activating Hologram Security System; and
    Step 7: Monitoring the Hologram Security System.

An embodiment for homeland security is a Special holographic homeland defense security systems comprised of: a.) an at least one Border patrol agent monitors the cameras with a hologram program which projects images of agents locating illegal entry points to US borders; and b). a hologram security system that alerts a border patrol command center when a sensor is activated which gives the exact location of an intruder making it virtually impossible to enter the US illegally. An embodiment for defense enhancements is a Special holographic defense security systems comprised of: a.) a holographic control system; b.) a stationary or movable support disk; c.) a hologram projector; d.) a pre-programed hologram image of a soldier or animal or vehicle with optional audio; e.) an optional ordinance with the platform; and f.) an optional soldier(s) for the patrol.

There is shown in FIGS. 1-19 a complete description and operative embodiment of the Special holographic security systems and similar holographic defense systems. In the drawings and illustrations, one notes well that the FIGS. 1-19 demonstrate the general configuration and use of this product. The various example uses are in the operation and use section, below.

The accompanying drawings, which are incorporated in and constitute a part of this specification, illustrate an embodiment of the Special holographic security and defense systems 30 that is preferred. The drawings together with the summary description given above and a detailed description given below serve to explain the principles of the Special holographic security systems and similar holographic defense systems 30. It is understood, however, that the systems 30 are not limited to only the precise arrangements and instrumentalities shown. Other examples of Special holographic security and defense systems are still understood by one skilled in the art of security systems and the art of holographic displays to be within the scope and spirit shown here.

FIG. 1 is a sketch of the basic Special holographic security systems 31 for homes and businesses. Demonstrated are components: Special holographic security systems 31 for homes and businesses; home and business security cameras 57; home and business security sensors 58; and use by private security 115 as a private security hologram image.

Figure 2:
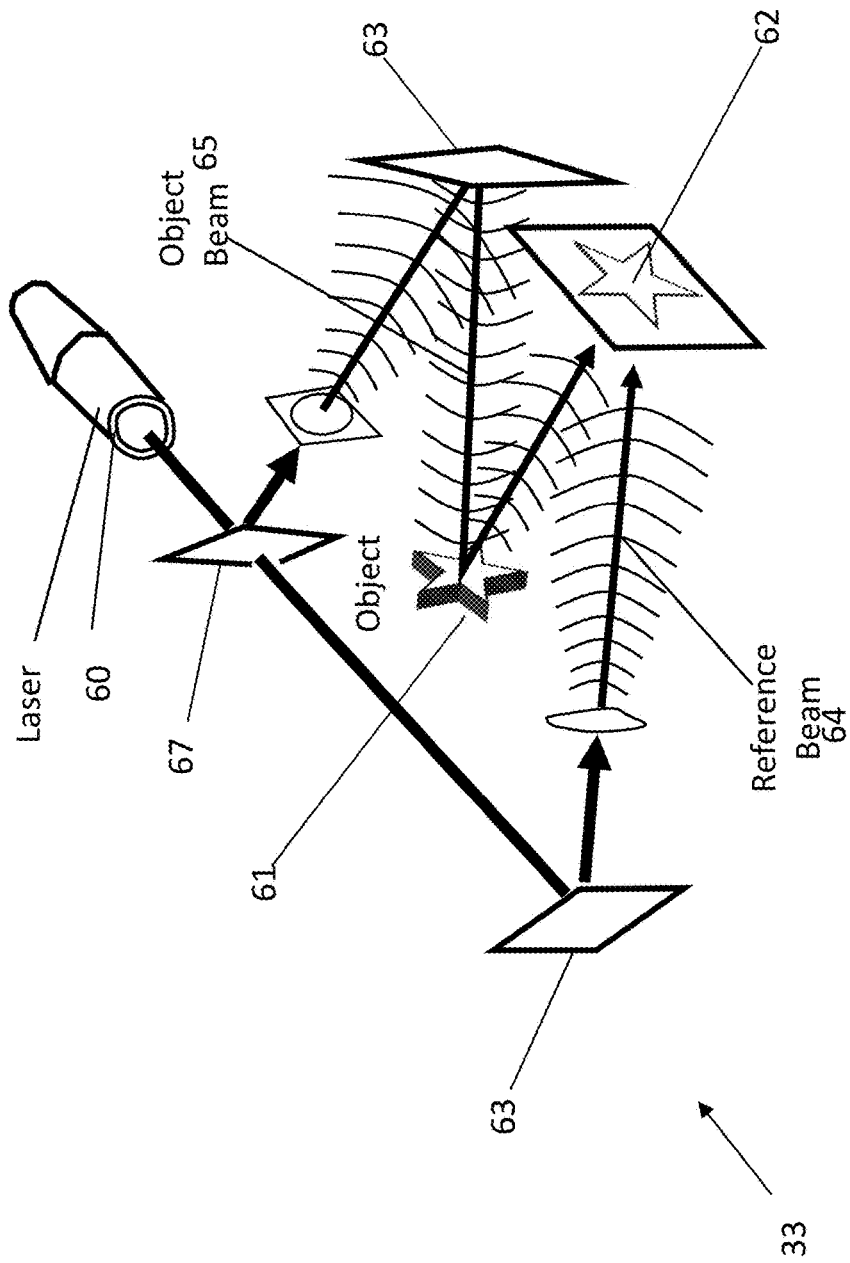
FIG. 2 is a basic hologram set-up sketch of how a Hologram works with components and features noted.
Figure 3:
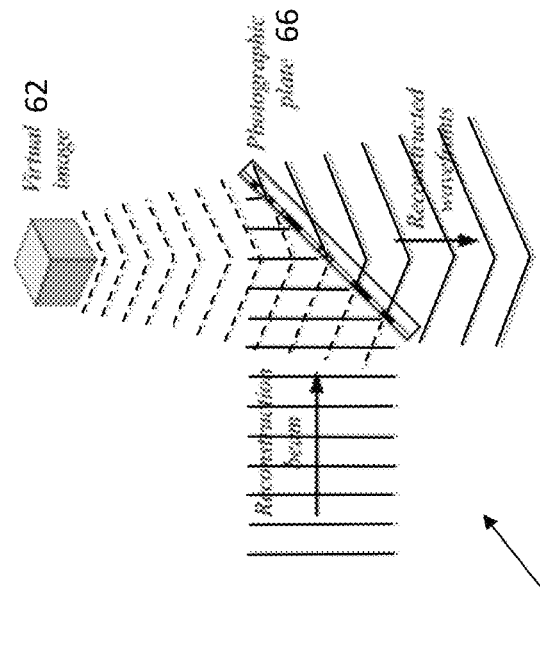
FIGS. 3A through 3D are additional sketches of a basic hologram set-up sketch of how a Hologram works in recording and reconstructing holograms with the components and features shown from generally a top view.
Figure 3:
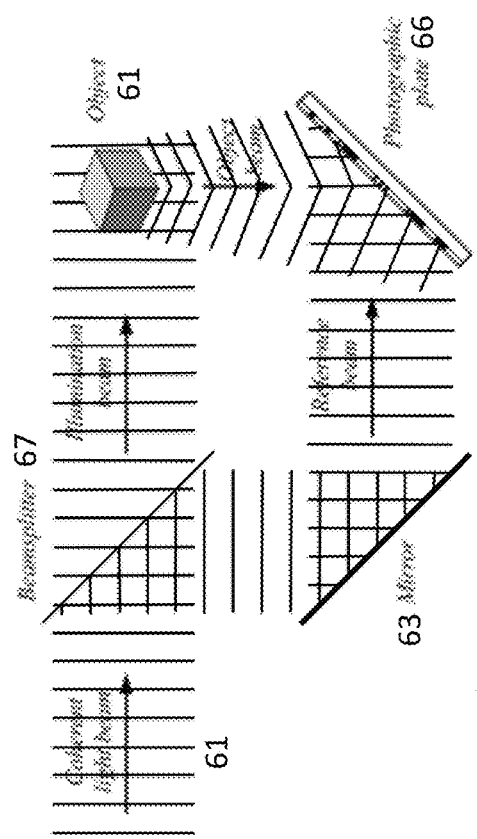
Figure 3:
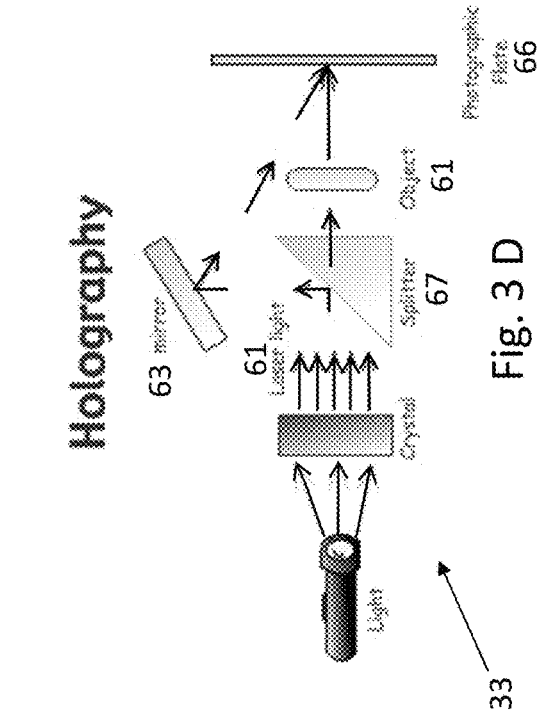
Figure 3:
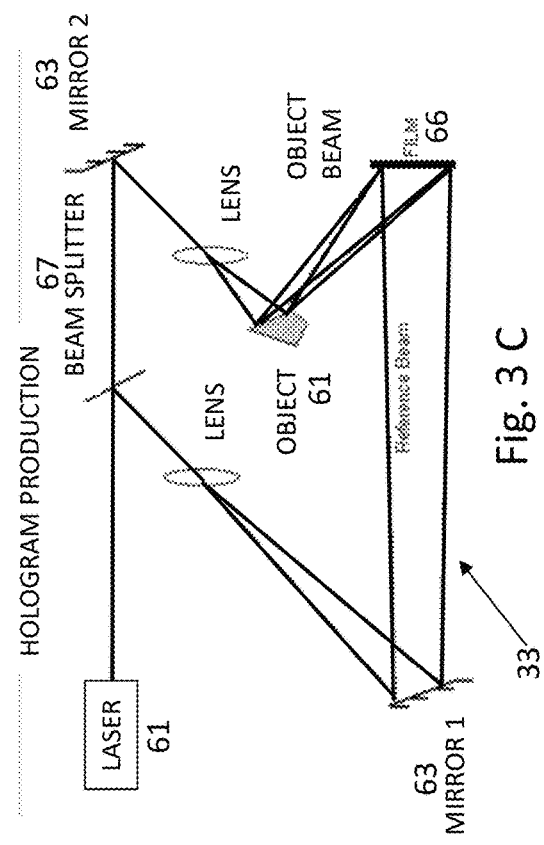
Figure 5A:
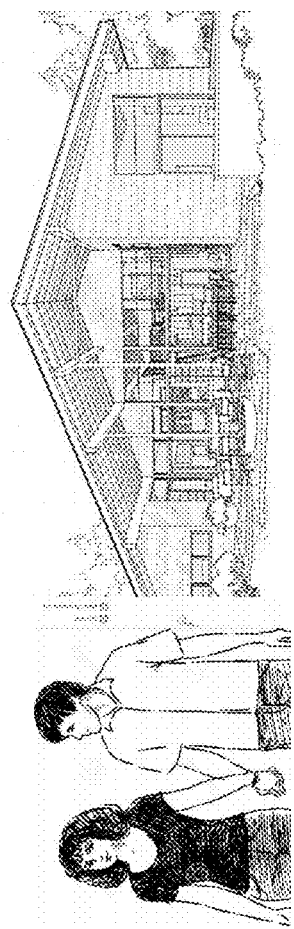
FIG. 5A through 5D are sketches of a Special holographic security systems for homes and businesses showing a home, business, business area and the criminal element to be deterred with the security system.
Figure 5B:
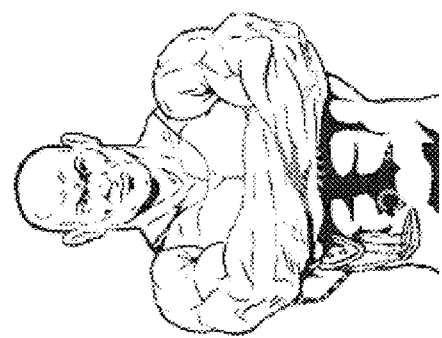
Figure 5C:
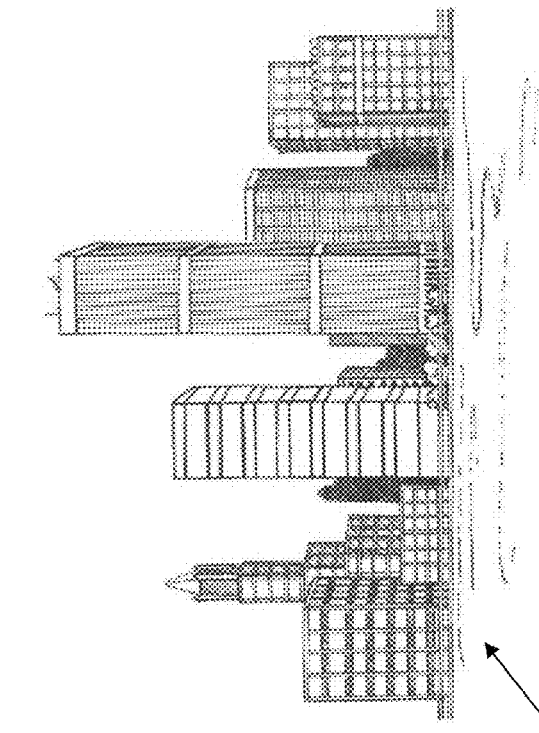
Figure 5D:
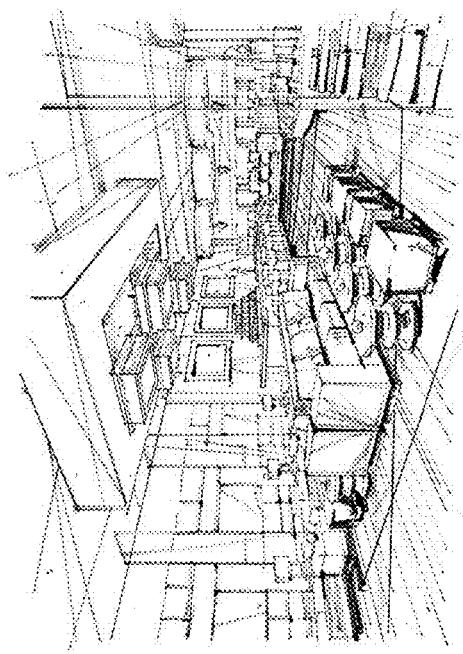

FIG. 2 is a basic hologram set-up sketch 33 of how a Hologram works with components and features noted. This sketch shows a basic hologram set-up sketch 33 of how a Hologram works; a laser light 60 to create hologram image; a hologram object 61; a hologram virtual 3-D image 62; some mirrors 63; a reference beam 64; an object beam 65; and a beam splitter 67. Here the laser points at the beam splitter, which divides the beam of light into two parts. Mirrors direct the paths of these two beams so that they hit their intended targets. Each of the two beams passes through a diverging lens and becomes a wide swath of light rather than a narrow beam. One beam, the object beam, reflects off of the object and onto the photographic emulsion. The other beam, the reference beam, hits the emulsion without reflecting off of anything other than a mirror.

FIGS. 3A through 3D are additional sketches 33 of a basic hologram set-up sketch of how a Hologram works in recording and reconstructing holograms with the components and features shown from generally a top view. Provided in these sketches are: a basic hologram set-up sketch 33 of how a Hologram works; a laser light 60 to create hologram image; a hologram object 61; a hologram virtual 3-D image 62; some mirrors 63; a reference beam 64; an object beam 65; a photographic plate 66 and a beam splitter 67. One notes that a Hologram is a three-dimensional image reproduced from a pattern of interference produced by a split coherent beam of radiation (as a laser) and the pattern of interference itself.

FIGS. 4A through 4D are more sketches of the Special holographic security systems 32 for homes and businesses with several options shown. These show different make-ups to placing the hologram system in the home or business. Components are: a Special holographic security systems 31 for homes and businesses; home and business security cameras 57; home and business security sensors 58; a programmed tracking or moving system 83; and use by private security 115 as a private security hologram image. FIG. 4A shows a Movable 1 hologram system from station 1 location to station 2. FIG. 4B shows a Different/Multiple hologram system a station 1 and station 2. Station 1 shows a person hologram 115 and station 2 shows a guard dog 115A. FIG. 4C shows multiple hologram systems at both station 1 and station 2. FIG. 4D shows a Movable 1 hologram system from station 1 to station 2 by way of a programmed tracking or moving system 83.

FIG. 5A through 5D are sketches of a Special holographic security systems 32 for homes and businesses showing a home, business, business area and the criminal element to be deterred with the security system. Here the sketches show: a home area 34; a business area or areas 35; and a criminal element 45. The Special holographic security systems 31 for homes and businesses are to deter the criminal element 45. The goal is to stay ahead of the criminal element 45 with systems at the facility as well as systems to deter hackers on the information laden computer systems.

Figure 6B:
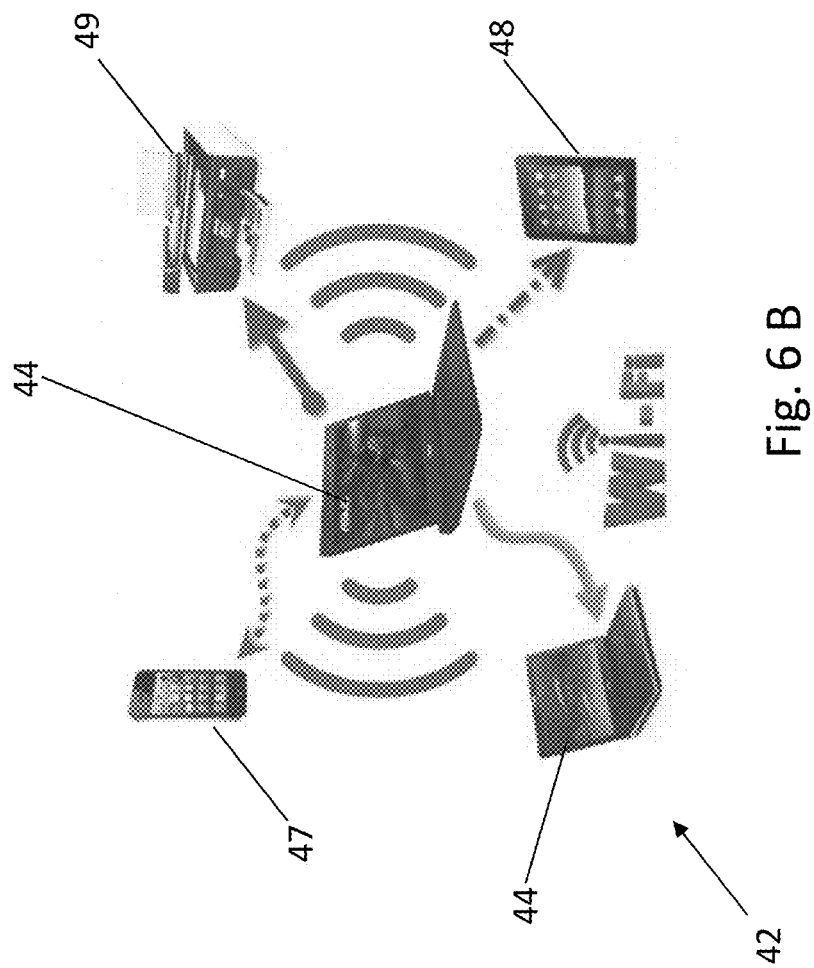
FIGS. 6A and 6B are sketches of home and business system 31 monitoring.
Figure 6A:
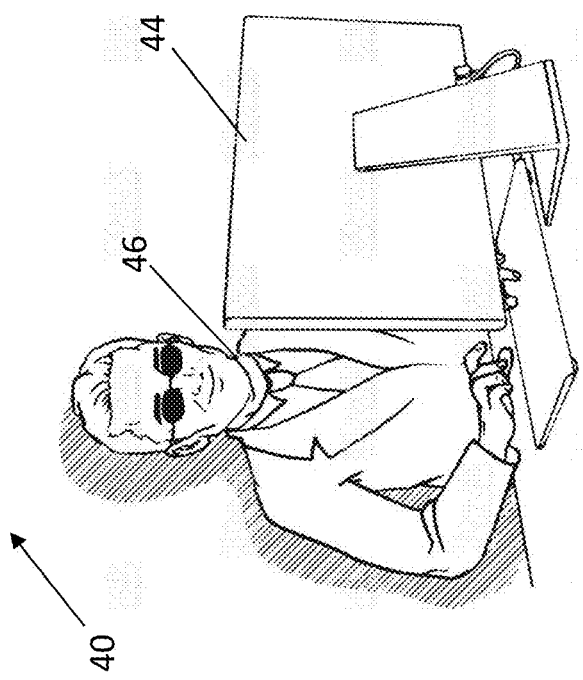
Figure 10:
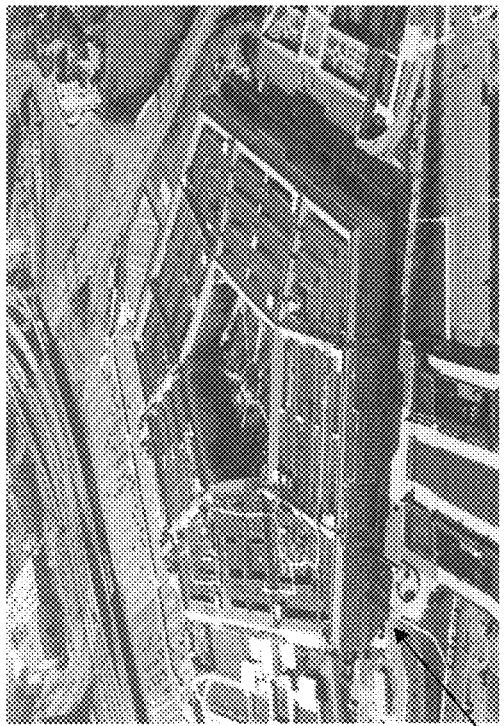
FIG. 10A through 10C are sketches of the users for the Special holographic systems for defense and homeland security.
Figure 10:
Figure 10:

FIGS. 6A and 6B are sketches of home and business system 31 monitoring. These provide a monitoring station 40 for home and business system 31; a monitoring station 41 for defense system 32; a Wi-Fi and system interconnects 42 for home and business system 31; a monitoring computer 44; a security monitor attendant 46; a cell phone/smart phone monitoring station 40 for home and business system 31; a tablet 48; and a printer 49. A system projecting a deterring image from one place in the US to another anywhere in the world with the capabilities to deter assailants and criminals that protects Americans from would-be terrorist organizations foreign and domestic!

FIG. 7A through 7D are sketches of holographic interconnect systems as well as computer security for the Special holographic security systems and similar holographic defense systems with components and features shown. In these sketches can be seen: Special holographic security systems 31 for homes and businesses; satellite 51 for transmitting signals and data; transceivers 52 of signals and data; transmission modes 53—wire and wireless; mobility support and protocol systems 54; a hacker 55; a mirror computer and system 56 to deter hacker 55; home and business security cameras 57; home and business security sensors 58; and satellite transmission communication 59. So the system components include: computer Systems (All Brands) large or small; a Satellite Link; a Wireless Access Point; A set of motion Sensors; cameras; and Smart phone, a smart watch, a computer tablet, a desk top personal computer, an emergency surveillance system of a security team/company, and other communication outlets with monitoring screens and audio systems. The hologram image automatically appears when it detects someone attempting to breach a computer system—the hacker. The image displayed to the hacker is created by the owner of the system. This may be used by small and large businesses as well as individuals. THIS IS AN EASY SETUP:

1. CREATE AN IMAGE FROM COMPUTER OR A PHOTO.
2. DOWNLOAD THE IMAGE OR PHOTO ONTO THE COMPUTER.

3. CREATE A VERBAL WARNING OF ONE'S CHOICE.
4. CONNECT TO WIFI AND OR UPLINK WITH SATELITIE.
5. SINK WITH SMART WATCHES AND ALL FORMS OF DESIRED COMMUNICATIONS.
6. DONE—HOLOGRAM SECURITY IS COMPLETE.

Hacker(s) think they are getting access to one's files to steal his information or attach a virus and in reality they are infecting their computer and alerting their intended victims and the authorities of their location anywhere in the world. This will then lead to the arrests of hackers and saving the US billions of dollars a year! The Mirror is a software approach to preventing hacking.

Definitions:
Host, the perpetrator, someone trying to view or download information to you, the client.
Client, the person who's computer is being attacked.
How it works:
The idea of a program called "Mirror" is to prevent the Client's computer from the attacks caused by Host computers trying to access information from the client computer or sending information to the Client computer, rendering the Client computer useless. When the Host computer is hacking, it is also telling the Client computer and its IP address and MAC address. With the software installed of the Client computer the Host will actually be looking at the Host computer and not allowing information to be transferred or programs that would harm the Client computer, would be loaded on the Host computer. Like a mirror, the unwanted IP addresses would be a reflection of the Host's computer.

FIGS. 8A and 8B are sketches of a deterring hologram FIG. 50 and a list of uses 80 for the Special holographic security and defense systems. Examples of deterring figures are described in FIGS. 9A through 9O. The uses 80 are shown in the Operation Section.

FIG. 9A through 9P are sketches of the uses 80 for the Special holographic systems for defense and homeland security. These sketches show: a security person 101; sporting event guards 102; a judge in court proceedings 103; a church sermon pastor and congregation 104; a special surgeon 105; a United Nations meeting 106; a public safety FIG. 107; a person in an intelligence operations 108; military operation personnel 109; funeral home industry 110 with memorial communications from the deceased; border guards in the Department of Homeland Security 111; an instructor in universities, colleges and schools 112; Federal Bureau of Prisons guard 113; a private investigator 114; a private security person 115; and a National Aeronautical and Space Administration (NASA) or space assist hologram 119.

FIG. 10A through 10C are sketches of the using agencies of the US government such as special holographic systems for Department of Defense 37 and Homeland Security 38. Also shown is the Pentagon 39, headquarters for the DOD.

Figure 11A:
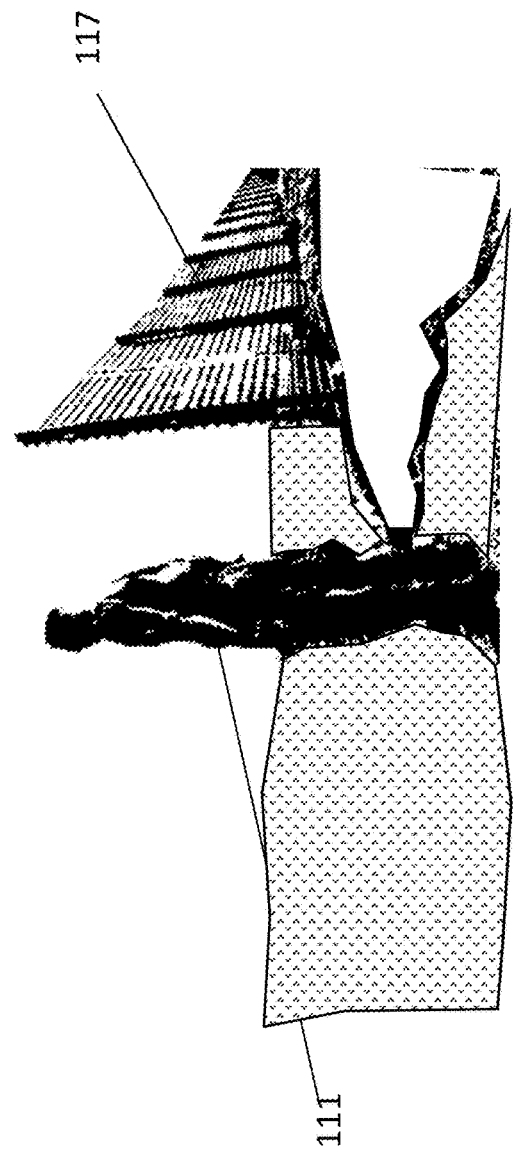
FIG. 11A through 11C are sketches of the Special holographic systems 32 for defense and homeland security used at the border and with border security forces.
Figure 11C:
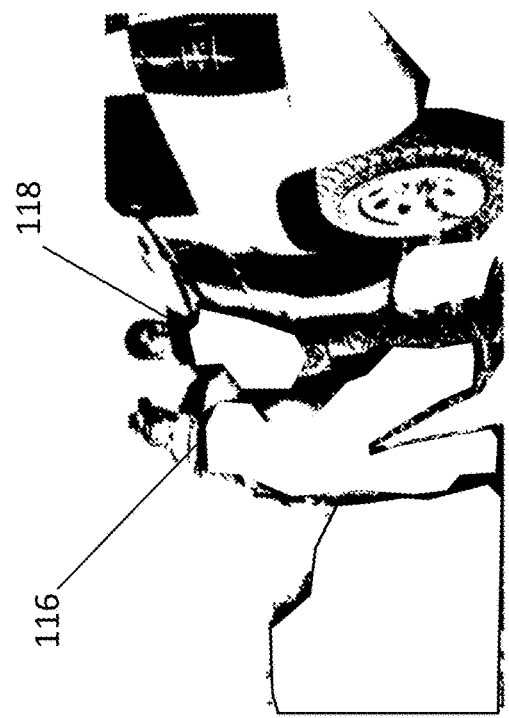
Figure 11B:
Figure 12:
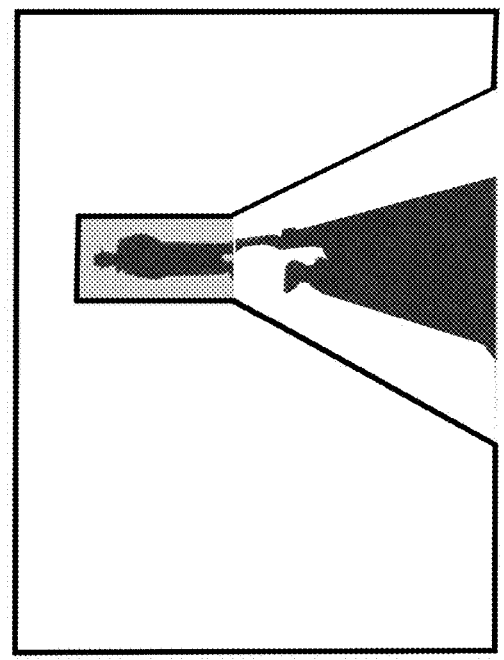
FIG. 12A through 12C are sketches of the Special holographic systems for defense and homeland security with intelligence and defensive soldiers as holograms depicted.
Figure 12:
Figure 12:
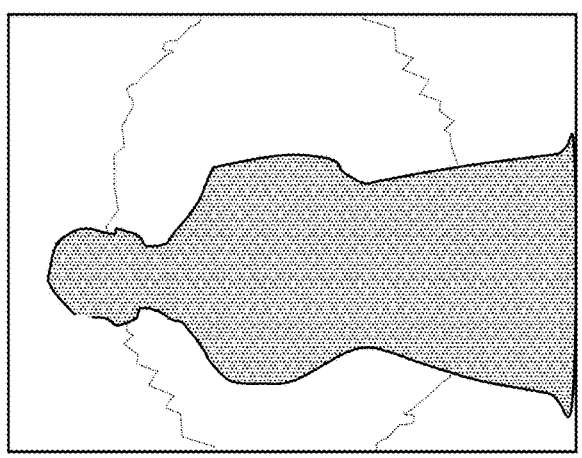
Figure 14:
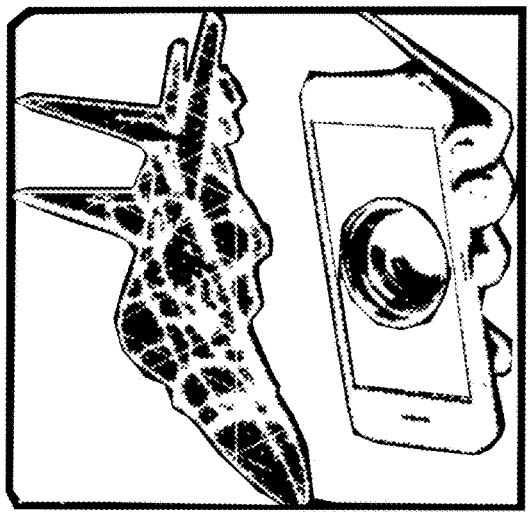
FIG. 14A through 14C are sketches of examples of hologram projector devices.
Figure 14:
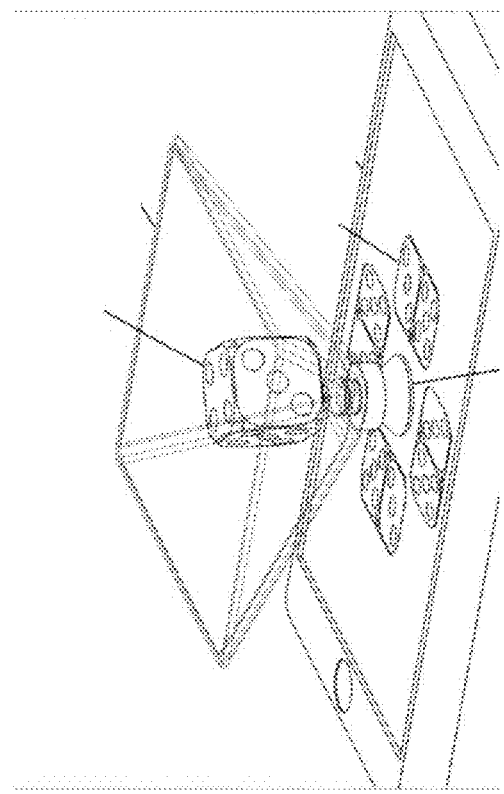
Figure 14:
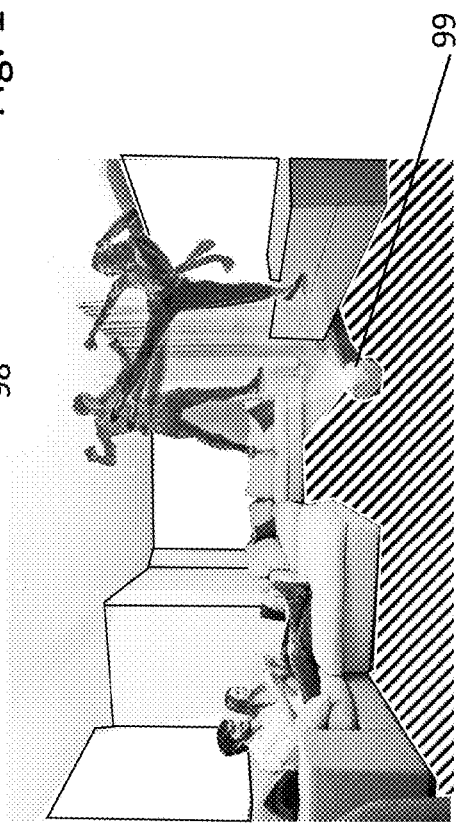
Figure 15:
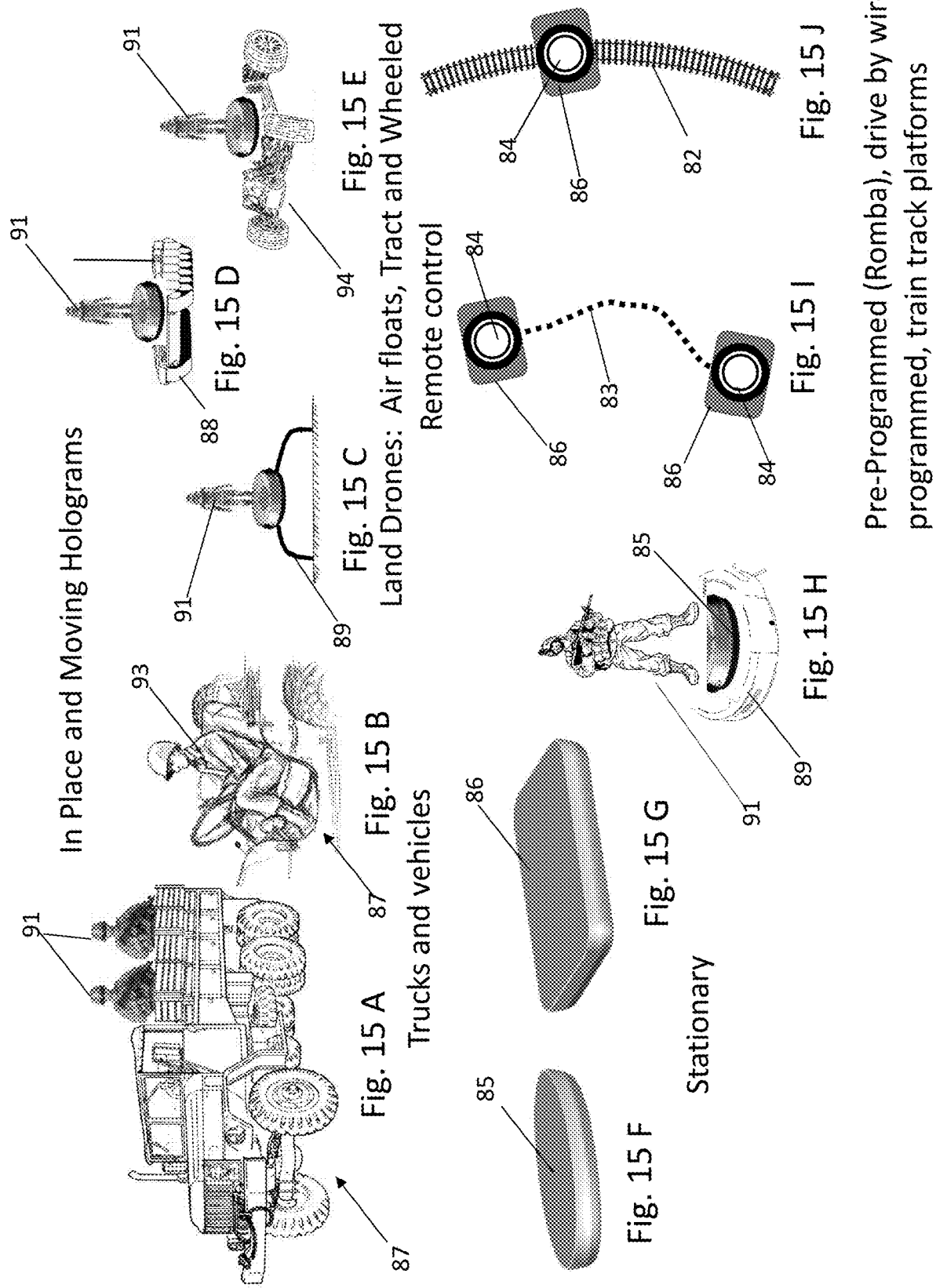
FIG. 15A through 15J are sketches of examples of deploying hologram projectors as stationary or movable systems for the Special holographic security systems and similar holographic defense systems.
Figure 16:
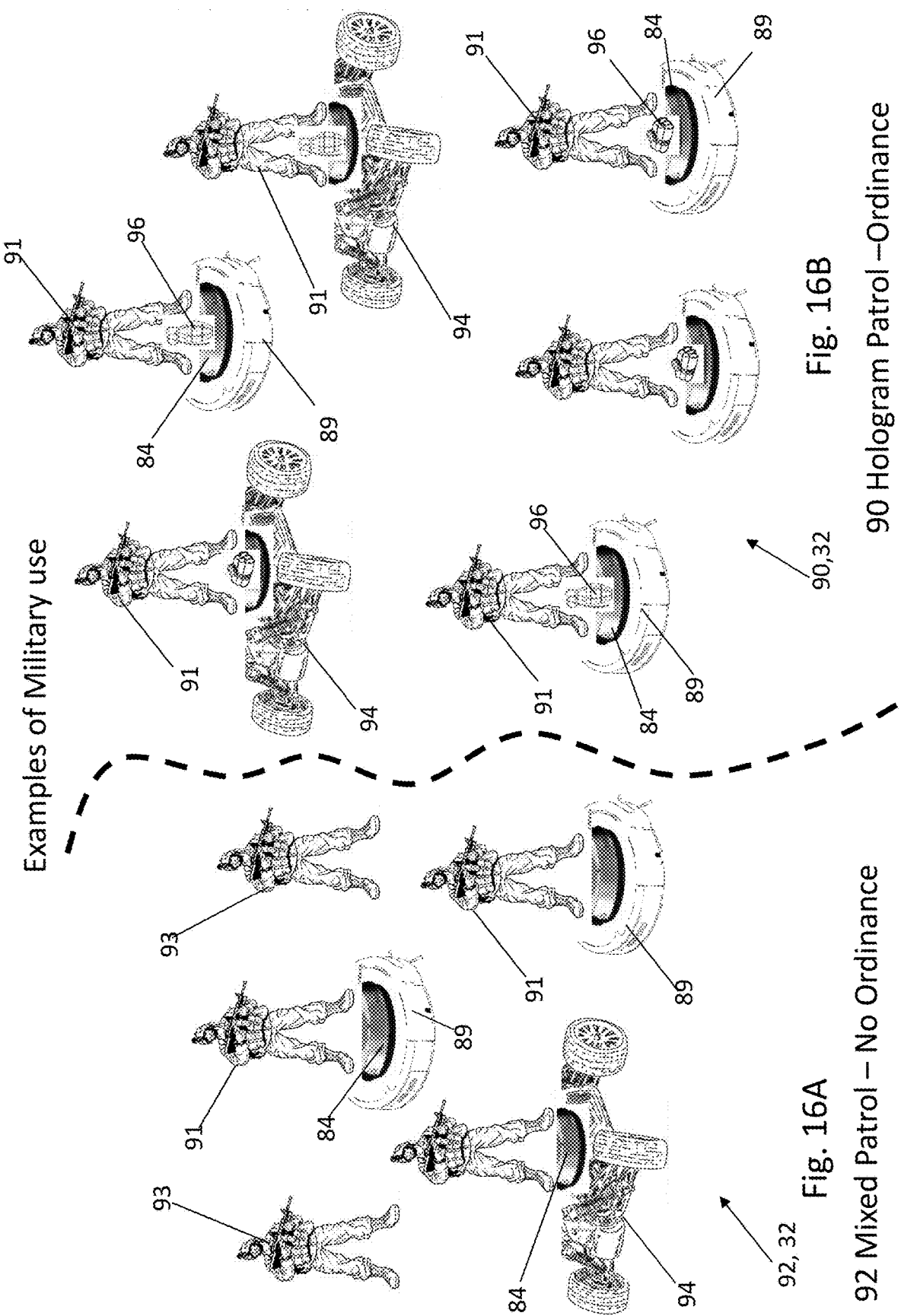
FIGS. 16A and 16B are sketches of the defensive uses as Mixed Patrol with No Ordinance and a Hologram Patrol with Ordinance.
Figure 17:
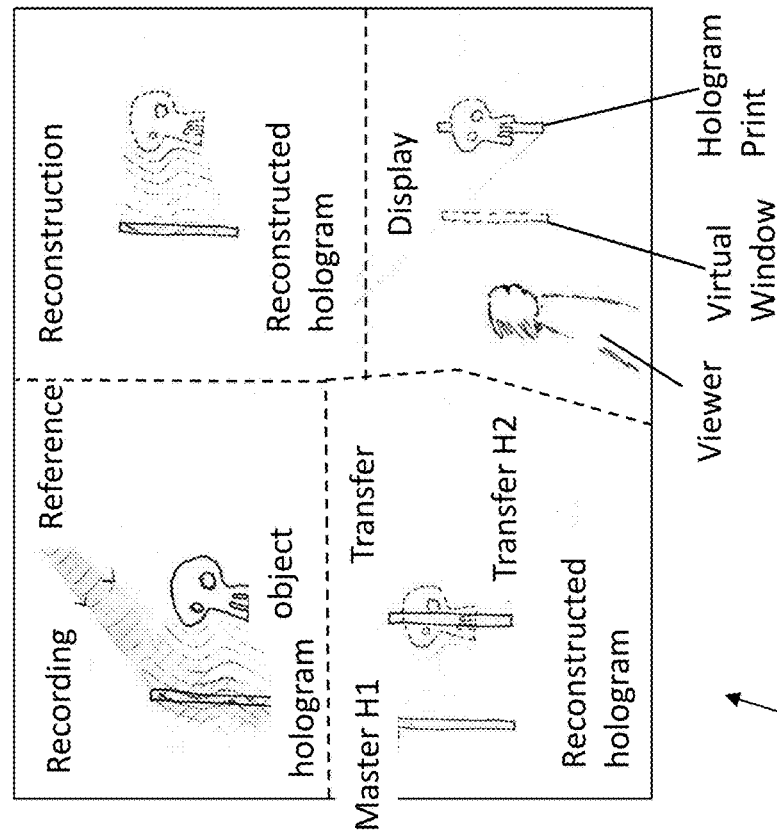
FIGS. 17A and 17B are early sketches of a layout for typical holographic system.
Figure 17:
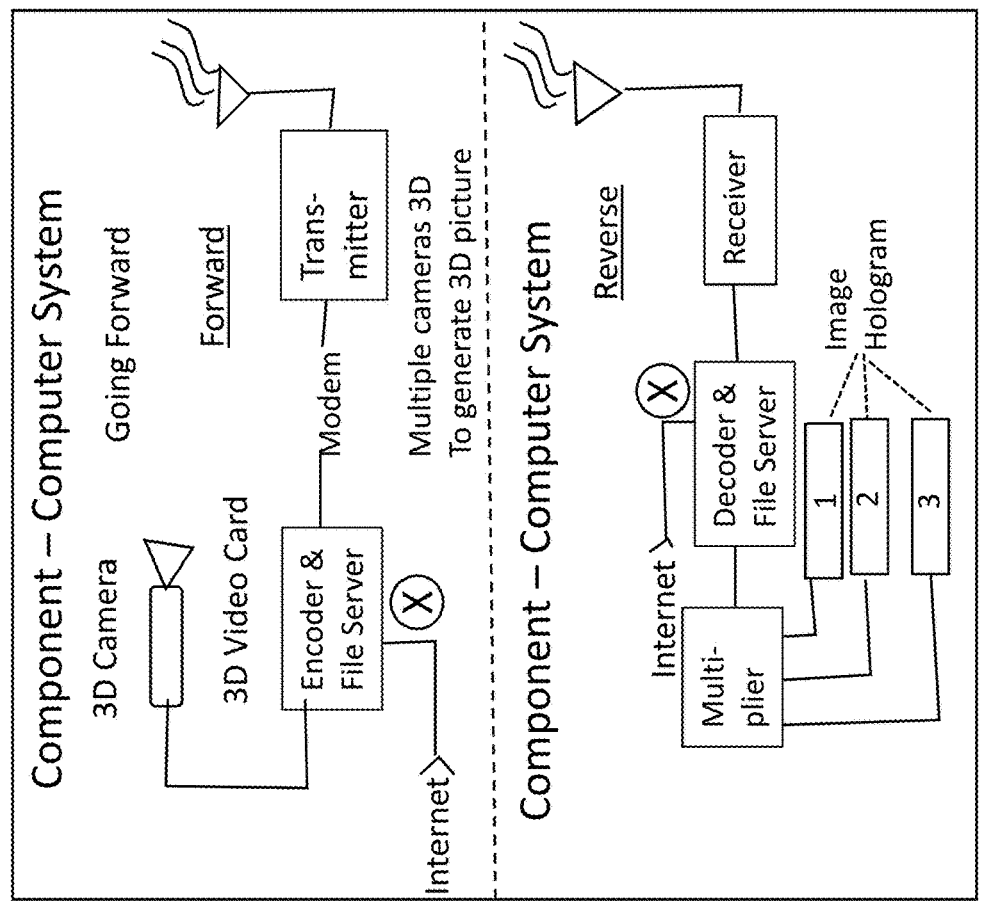
Figure 18:
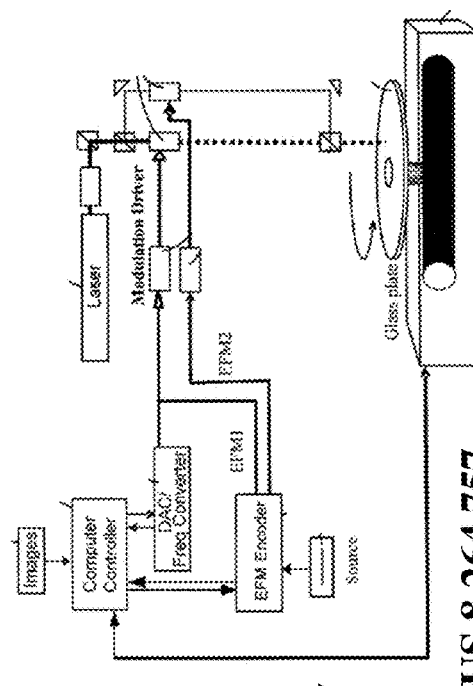
Figure 18:
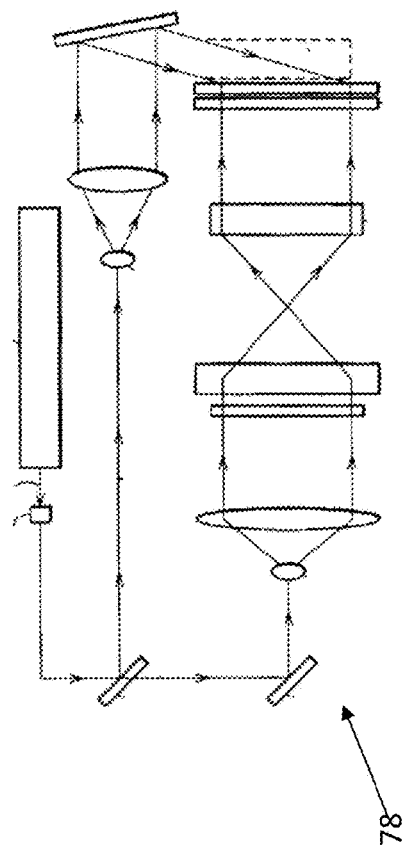
Figure 18:
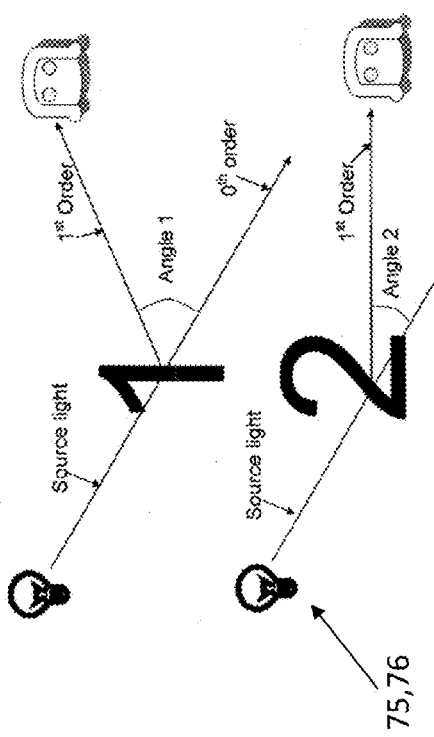
Figure 18:
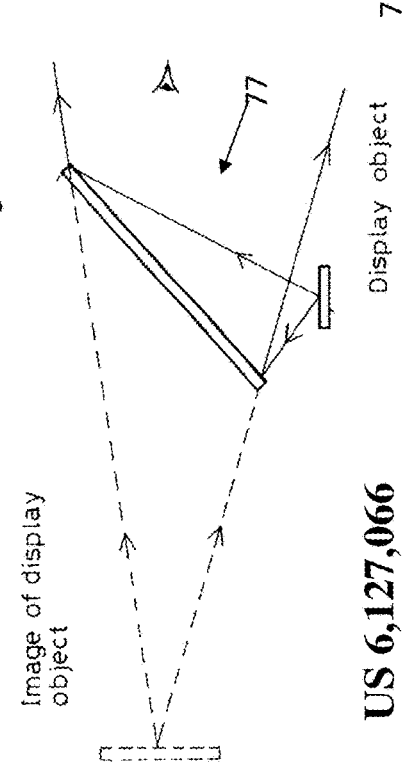

FIG. 11A through 11C are sketches of the Special holographic systems 32 for defense and homeland security used at the border and with border security forces. Portrayed here are: monitoring station 41 for defense system 32; use by a border guard for the Department of Homeland Security 111; border guards 116 watching the monitors 41; a border fence or obstacle 117; and a border detainee 118. The guards 116 help protect the border. A hologram image 111 at a fence 117 shows opportunity to use Holograms to expand the virtual presence of guards 116. Border patrol agents 116 monitor on the screens 41 the cameras with a hologram program that projects images 111 of agents locating illegal entry points to US borders. The hologram security system alerts the command center when a sensor is activated giving the exact location of the intruder 118 making it virtually impossible to enter the US illegally.

FIG. 12A through 12C are sketches of the Special holographic systems for defense and homeland security with intelligence and defensive soldiers as holograms depicted. Shown here are: a Hologram soldier 91; a use in intelligence operations 108; and a use by private investigations 114. This can change the future of intelligence operations. Imagine a hologram security image of an intelligence agent from the United States gathering classified information to protect from terrorists, both foreign and domestic. These terrorists want to do harm. How can one gather intelligence without being seen or heard or captured—and without casualties? Q: HOW? A: The DOD, DHS, Central Intelligence Agency (CIA), National Security Agency (NSA), Federal Bureau of Investigations (FBI) and all local. State and federal agencies can create a hologram security system for real time investigations and operations keeping the country safe and saving agent lives and innocent persons attacked by terrorists—all without bloodshed.

FIG. 13A through 13G are sketches of examples of holograms used for the Special holographic security systems and similar holographic defense systems 32. The figures shown are: a business person hologram image 70; a sign language communicator hologram image 71; a motion picture hologram image 72 from different genres; a military operations personnel 109; a private security person or guard 115; and a guard dog or other non-human guard device hologram image 115A.

FIG. 14A through 14C are sketches of examples of hologram projector devices. Indicated here are: a typical up-direction prism hologram projector 97; a smart phone up-direction hologram projector 98; and a convention action video hologram projector 99.

FIG. 15A through 15J are sketches of examples of deploying hologram projectors as stationary or movable systems for the Special holographic security systems and similar holographic defense systems. Demonstrates are sketches that show the following: a track/train track lead system 82; a Pre-Programmed (Roomba), drive by wire/programmed tracking or moving system 83; a circular projector 84; a stationary disk 85; an oblong stationary platform 86; a military vehicle 87 such as a truck, jeep, tank, half-track etc.; a moving tread Radio Controlled carry device 88; a Radio Controlled air float, floating base/carry device 89; a Hologram soldier 91; a soldier 93; and a Radio Controlled moving four wheel carry device 94.

FIGS. 16A and 16B are sketches of the defensive uses as Mixed Patrol with No Ordinance 91 and a Hologram Patrol with Ordinance 94. Portrayed here are: Special holographic systems 32 for defense and homeland security; a circular projector 84; a Radio Controlled air float, floating base/carry device 89; Hologram Patrol—Ordinance 90; a Hologram soldier 91; Mixed soldier and hologram patrol—no ordinance 92; a soldier 93; a Radio Controlled moving four wheel carry device 94; and ordinance 96—explosive devices with various detonation—contact, timed, remote control etc.

FIGS. 17A and 17B are early sketches of a layout for typical holographic system. FIG. 17A shows an early prototype system design sketch 73 by the inventor Johnson. FIG. 17B shows another typical holographic system design sketch 74 by an unknown author.

FIG. 18A through 18D and FIG. 19 are sketches of prior art. Here former patents and applications for various holographic devices and uses are shown. These include:

1. U.S. Pat. No. 8,264,757 (75) issued to Ha in 2012 and entitled—Method and system for producing multiple images in a single image plane using diffraction. It teaches methods create images viewable under different selected angles on optical storage devices and other photosensitive surfaces and optical storage devices with super-imposed images. Generally, a photosensitive surface is exposed with multiple diffraction patterns creating super-imposed images. These diffraction patterns create super-imposed images on the photosensitive surfaces, which can be read by either a human or a computer.
2. U.S. Pat. No. 8,717,650 (76) issued to Ha in 2014 and entitled—Method and system for producing multiple images in a single image plane using diffraction. This patent shows methods create images viewable under different selected angles on optical storage devices and other photosensitive surfaces and optical storage devices with super-imposed images. Generally, a photosensitive surface is exposed with multiple diffraction patterns creating super-imposed images. These diffraction patterns create super-imposed images on the photosensitive surfaces, which can be read by either a human or a computer.
3. U.S. Pat. No. 6,127,066 (77) issued to Ueda et al. in 2000 entitled Hologram recording sheet, holographic optical element using said sheet, and its production process. This patent teaches the hologram recording sheet according to the invention is made up of a base film and hologram sensitive materials sensitive to different wavelength regions formed therein in a desired pattern, or a film and at least two hologram recording sensitive materials sensitive to different wavelength regions laminated on the film with a transparent plastic spacer layer located there between, thereby enabling the required diffraction light wavelengths to be recorded on the required sites without producing unnecessary interference fringes. At least two hologram recording sensitive materials sensitive to different wavelength regions are formed on different sites on a film in dotted or striped configuration, the size of which is up to 200 mm or at least twice as large as the thickness of the sensitive material layers, thereby enabling regions diffracting light of different wavelengths to be formed in the form of independent sets of interference fringes.
4. U.S. Pat. No. 6,856,434 (78) issued to Ashizaki in 2005 and entitled Image reproducing apparatus and image illuminating apparatus. The invention provides that the angle of incidence of reproducing light with respect to a hologram or a holographic stereogram is adjusted so that a reproduced image can be repetitively viewed without requiring the viewer to move his or her viewpoint. The components of the image reproducing apparatus can be roughly classified into a power supply unit equipped with a power supply for generating a driving power and various types of electric circuits, a light source unit equipped with light emitting diodes and the like, a supporting unit for supporting the light source unit, and a holographic stereogram display unit for holding the holographic stereogram and displaying an image. In this image reproducing apparatus, the light source unit is swing ably or turn ably moved repetitively with respect to the holographic stereogram so that the reproducing light has angle of incidence changed on the holographic stereogram, thus allowing change of viewed image.
5. US Patent Application 2015/0220058 (79) by HA and Sung Sub was published in 2015 and is entitled—Device for protecting crops using hologram of natural enemy eyes and method for fabricating the same. This application disclosed a device for protecting crops from wildlife, comprising an optical base film on both sides of which fluorescent holograms of natural enemies with both eyes and optionally claws or talons are laser printed while a composition containing a phosphorescent material and a repellent is applied to both eyes, and optionally to the claws or talons, and a method for fabricating the same. Oils and extracts from herbs are used selectively as ingredients in the repellent depending on repelling targets, that is, mammals, rodents and birds. In addition, the use of phosphorescent material exerts a repellent effect on nocturnal animals. Thus, the device exhibits high durability and can be used for protection from wildlife damage in various targets.

The details mentioned here are exemplary and not limiting. Other specific components and manners specific to describing a Special holographic security systems and similar holographic defense systems 30 may be added as a person having ordinary skill in the art of security systems and the art of holographic displays and their uses well appreciates.

Operation of the Preferred Embodiment

The Special holographic security systems and similar holographic defense systems 30 has been described in the above embodiment. The manner of how the device operates is described below. One notes well that the description above and the operation described here must be taken together to fully illustrate the concept of the Special holographic security systems and similar holographic defense systems 30.

A special holographic security system utilizing and centered on holographic images of homeowners or security guards to provide safety for a person's home, businesses and properties by incorporating the hologram image with the sensors, lights, cameras and other security hardware. The hologram image can be incorporated with sound, pre-recorded messages, and real time surveillance, and smart phone applications to interact with potential break-ins and security breaches. Also taught are significant ways and methods that use of holographic systems can improve homeland security as well as defense tactics to increase security and save lives. This holographic security concept can be implemented in various creative ways to preserve security in the United States and abroad.

The preferred embodiment of a Special holographic security systems and similar holographic defense systems is comprised of: a.) at least one Computer System; b.) a Satellite Link; c.) a Wireless Access Point; d.) a set of motion Sensors; e.) at least one powered hologram stationary or movable support disk; f.) a Hologram projector; g.) a Pre-programed holographic image and optional audio message; and h.) a monitoring devices such as Smart phone, a smart watch, a computer tablet, a desk top personal computer, an emergency surveillance system of a security team/company, and other communication outlets with monitoring screens and audio systems wherein a sensor breach communicates with a satellite link which in turn activates the hologram security system and alerts the local police and the home or business owner at the same time and produces a hologram image in real time to detect and deter criminal activity. An alternative to the preferred system is one where the satellite link is comprised of at least one satellite, at least one receiving dish; and wired or wireless linkage to the monitoring computer system. Another embodiment is a method for using a Special holographic security systems comprised of:

Step 1: Purchasing a hologram security system by home owners, business owners, DOD, DHS, Private Sector, or Global Businesses for securing their property.

Step 2: Assemblying the easy to use Hologram Security System with Satellite Link;

Step 3: Connecting all desired communication devices to the Hologram Security System;

Step 4: Uploading desired hologram security image with verbal alert into the Hologram Security System;

Step 5: Strategically placing the hologram security system in desired area and place sensors near areas of concern for both inner and outer perimeters;

Step 6: Activating Hologram Security System; and

Step 7: Monitoring the Hologram Security System.

An embodiment for homeland security is a Special holographic homeland defense security systems comprised of: a.) an at least one Border patrol agent monitors the cameras with a hologram program which projects images of agents locating illegal entry points to US borders; and b). a hologram security system that alerts a border patrol command center when a sensor is activated which gives the exact location of an intruder making it virtually impossible to enter the US illegally. An embodiment for defense enhancements is a Special holographic defense security systems comprised of: a.) a holographic control system; b.) a stationary or movable support disk; c.) a hologram projector; d.) a pre-programed hologram image of a soldier or animal or vehicle with optional audio; e.) an optional ordinance with the platform; and f.) an optional soldiers for the patrol.

The Special holographic security systems and similar holographic defense systems 30 operates as the following steps:

Step 1: Home owners, Business owners, DOD, DHS, Private Sector, or Global Businesses are strongly encouraged to purchase a hologram security system for their property.

Step 2: Assemble the easy to use Hologram Security System with Satellite Link;

Step 3: Connect all desired communication devices to the Hologram Security System;

Step 4: Upload desired hologram security image with verbal alert into the Hologram Security System;

Step 5: Strategically place hologram security system in desired area and place sensors near areas of concern for both inner and outer perimeters; and Step 6: Activate Hologram Security System.

So the system components include: computer Systems (All Brands) large or small; a Satellite Link; a Wireless Access Point; A set of motion Sensors; cameras; and Smart phones, smart watches and all emergency and other communication outlets. How it Works: It is a 4 part process that involves a sensor breach that communicates with a satellite link which in turn activates the hologram security system and alerts the local police and the home or business owner at the same time and produces a hologram image in real time to detect and deter criminal activity.

Many uses are anticipated for the Special holographic security systems and similar holographic defense systems 30. These are listed in the FIG. table 80 and shown in FIGS. 9A through 9O. These include as some examples, and not limitations, which are shown in the following Table:

| 1 | use as security 101 |
| 2 | use at sporting events 102 |
| 3 | use in court proceedings 103 |
| 4 | use for church sermons in restricted areas 104 |
| 5 | use for special surgeries 105 |
| 6 | use for United Nations meetings 106 |
| 7 | use in public safety 107 |
| 8 | use in intelligence operations 108 |
| 9 | use in military operations 109 |
| 10 | use in the funeral home industry 110 with pre-recorded communications from the deceased |
| 11 | use by the Department of Homeland Security 111 |
| 12 | use by universities, colleges and schools 112 |
| 13 | use by the Federal Bureau of Prisons 113 |
| 14 | use by private investigations 114 |
| 15 | use by private security 115 |
| 16 | use by a NASA or space assist hologram 119 |

These represent ideas of "Augmented Reality". That is the concept that takes a Life size version of a hologram to do what is needed for use and improvement. Some examples may help to describe the operations:

A. Picture This: A family member that has an incurable disease and is gravely ill making a last will and testament via bed side using a "Hologram image" of him or herself for their beloved family. The ill family member can be recorded and a 3 dimensional image can be taken and displayed at the time of funeral or in that special time of need.

B. Picture This: A military veteran overseas makes a "Hologram Image" Heart Felt message for his family, wife, girlfriend or anyone the soldier chooses. The message can be displayed in the place of the receiver's choice and it will be as if their beloved soldier is in the same location with them even though they are hundreds or even thousands of miles away.

C. Picture This: The US armed forces are deployed on a mission in Afghanistan or anywhere in the Middle East and they are searching for terrorist and are weary of explosives and ambushes. The unit commander can utilize a "Hologram Soldier" to walk through the area of concern expose the enemy and capture them without any harm to this Nation's soldiers. How one may ask? Example: A Hologram of a soldier or unit walking through the area of concern and the enemy attacks, exposing their location, the commander radios the air strike and enemy vanquished!

D. Picture This: A surgeon with a specialty in a rare field of medicine can assist any surgeon anywhere in the world by "Hologram Image" and it will be as if they are in the same operating room but they are somewhere else in the world. The surgeon can instruct an operating team or doctor in real time if the operation is life or death and required that particular surgeon's area of expertise. A Hologram machine with real time features can be placed in every hospital or triage center in the whole world and imagine the countless lives, time that can be saved and maybe less Malpractice suits in the future.

E. Example: A little girl has a rare disease and requires an operation but the only doctor in the world who can perform this operation is in another part of the world and can't be there in a timely manner. The doctor in charge then calls the specialist and employs the "Hologram Image" or "Virtual Surgeon" and he or she assists the operating team with the procedure and seeing everything in real time as if he or she was in the very operating room.

F. Picture This: Getting the word of God out to countless Christians throughout the world even the places where Christians are persecuted around the world even in adverse. Example: Using a "Hologram Image" or "Virtual Pastor" this can be used by pastors from all walks of life reading the word of God and preaching any sermon bringing souls to Christ! It is stated that humans are living in the last days and the devil is trying to take as many souls with him to hell through his hatred of God for creating us. He and his demons are fulfilling the prophecy written in the Bible in the book of revelations. To combat him pastors from all around the world can use virtual pastoring and get the word to lost souls and bring them to Jesus. Youth pastors can speak with children with studies and can be somewhere else in the world and bring the message of the cross in real time as if they were there in person with the children.

G. Picture This: A loved one on their death bed and they are requesting a pastor any pastor to pray for them before they leave this earth. "Hologram Image" or "Virtual Pastor" can help praying for the person who request for a pastor and the pastor will ask him or her if they accept Jesus as their lord and savior and believed that he died on the cross for sins? If they say yes then Hallelujah that individual will spend eternity with the lord!

H. Picture This: A person contemplating suicide and a soldier suffering from PTSD (Post-Traumatic Stress Disorder) is about ready to commit the act and activates "Virtual Pastor" and has a change of heart and chooses life instead. This holographic system can be a great tool for the Mental Health Field. The possibilities are "virtually" endless.

I. Picture This: Picture an elderly woman leaving her house to go get groceries and she returns to find her home where she spent raising her family, was burglarized by crooks. A hologram figure may deter this danger and potential harm.

J. Picture This: Hologram image use for NASA and other space exploration entities. They are provided a hologram astronaut in lieu of a real astronaut, for space exploration to gather scientific information for research, while obtaining the vital information without injury or the possibility of loss of life of this Nations's astronauts.

With this description it is to be understood that the Special holographic security systems and similar holographic defense systems 30 is not to be limited to only the disclosed embodiment of product. The features of the Special holographic security and defense systems 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at

What is claimed is:

1. A movable holographic security systems comprised of:
   a.) at least one mirror computer and System (56) to deter a hacker (55);
   b.) a satellite Link;
   c.) a wireless Access Point;
   d.) at least one motion Sensor;
   e.) at least one powered and mechanically movable support disk on a means for moving the at least one powered and mechanically movable support disk from one location to a next location;
   f.) a Hologram projector secured to the at least one powered and mechanically movable support disk;
   g.) a pre-programed holographic image for a selected use; and
   h.) at least one monitoring device having a monitoring screen and an audio system,
   wherein a sensor breach communicates with a satellite link which in turn concurrently activates the hologram security image and system, produces a hologram image in real time, alerts the local police, and contacts the home and/or business owner to detect and deter criminal and wherein the hologram projector is physically moved by the movable support disk on the means for moving the at least one powered and mechanically movable support disk from one location to a next location to provide the appearance of activity over a course of time.

2. The movable holographic security systems according to claim 1 wherein the satellite link is comprised of at least one satellite, at least one receiving dish; and a wired and/or wireless linkage to the monitoring computer system.

3. The movable holographic security systems according to claim 1 wherein the means for moving the powered and mechanically movable support disk is selected from a group consisting of a track/train track lead system (82); a Pre-Programmed (Roomba®-like), drive by wire/programmed tracking or moving system (83); a military vehicle (87) such as a truck, jeep, tank, half-track etc.; a moving tread Radio Controlled carry device (88); a Radio Controlled air float, floating base/carry device (89); and a Radio Controlled moving four wheel carrying device (94).

4. The movable holographic security systems according to claim 1 wherein the group of monitoring devices is selected from a group consisting of a Smart phone, a smart watch, a computer tablet, a desk top personal computer, an emergency surveillance system of a security team/company, and other communication outlets with monitoring screens and audio systems.

5. The movable holographic security systems according to claim 1 wherein the selected use is selected from a group consisting of use as security (101), at sporting events (102), in court proceedings (103), for church sermons in restricted areas (104), for special surgeries (105), for United Nations meetings (106), in public safety (107), in intelligence operations (108), in military operations (109), in the funeral home industry (110) with pre-recorded communications from the deceased, by the Department of Homeland Security (111), by universities, colleges and schools (112), by the Federal Bureau of Prisons (113), by private investigations (114), by private security (115), and by a NASA and/or space assist hologram (119).

6. The movable holographic security systems according to claim 1 wherein the pre-programed holographic image for a selected use is further comprised of an audio message.

7. The movable holographic security systems according to claim 1 which is customized for a homeland defense security system and is further comprised of:
   a.) at least one Border patrol agent that monitors the monitoring screen of the monitoring device with a hologram program and commands the at least one computer system to project holographic images of agents from hologram projectors located at illegal entry points to US borders and
   b). a hologram security system that alerts a border patrol command center when a sensor is activated at the illegal entry point to US borders which gives the exact location of an intruder thereby making it virtually impossible for a person to enter the US illegally.

8. The movable holographic security systems according to claim 1 which is customized for a defense security system and is further comprised of:
   a.) a pre-programed hologram image with audio; and
   b.) an ordinance device with the movable platform.

9. The defense security system according to claim 8 that is further comprised of a holographic soldier(s) for the patrol.

10. The movable holographic security systems according to claim 8 wherein the pre-programed hologram image is selected from a group consisting of a soldier, an animal, and a vehicle.

* * * * *